United States Patent
Seike

(10) Patent No.: US 11,953,378 B2
(45) Date of Patent: Apr. 9, 2024

(54) CONTROL DEVICE, DISPLAY DEVICE CONTROL SYSTEM, AND CONTROL METHOD OF CONTROL DEVICE

(71) Applicant: SHARP KABUSHIKI KAISHA, Sakai (JP)

(72) Inventor: Yohko Seike, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/950,620

(22) Filed: Sep. 22, 2022

(65) Prior Publication Data
US 2023/0103679 A1   Apr. 6, 2023

(30) Foreign Application Priority Data
Oct. 4, 2021   (JP) .................. 2021-163275

(51) Int. Cl.
| | | |
|---|---|---|
| *G01J 3/50* | (2006.01) | |
| *G01K 1/02* | (2021.01) | |
| *G01K 3/00* | (2006.01) | |
| *G01K 3/08* | (2006.01) | |
| *G09G 3/34* | (2006.01) | |
| *G09G 3/36* | (2006.01) | |

(52) U.S. Cl.
CPC ............ *G01J 3/506* (2013.01); *G01K 1/026* (2013.01); *G01K 3/005* (2013.01); *G01K 3/08* (2013.01); *G09G 3/3607* (2013.01); *G09G 3/3406* (2013.01); *G09G 2320/0242* (2013.01); *G09G 2320/045* (2013.01); *G09G 2320/0666* (2013.01); *G09G 2320/0673* (2013.01); *G09G 2320/0693* (2013.01); *G09G 2330/026* (2013.01); *G09G 2360/145* (2013.01); *G09G 2370/00* (2013.01)

(58) Field of Classification Search
CPC .. G09G 2320/00–693; G09G 2360/145; G01J 3/506
See application file for complete search history.

(56) References Cited

U.S. PATENT DOCUMENTS

| | | | |
|---|---|---|---|
| 2010/0045211 A1* | 2/2010 | Kitamura | G09G 3/3611 315/309 |
| 2010/0188418 A1 | 7/2010 | Sakai et al. | |
| 2013/0321361 A1* | 12/2013 | Lynch | G09G 3/3225 345/204 |

(Continued)

FOREIGN PATENT DOCUMENTS

JP   2010-169922 A   8/2010

*Primary Examiner* — William Boddie
*Assistant Examiner* — Bipin Gyawali
(74) *Attorney, Agent, or Firm* — ScienBiziP, P.C.

(57) ABSTRACT

A control device includes: a warm-up determiner which determines, when color calibration of a display device is to be performed, whether a warm-up of a colorimeter is necessary, based on a predetermined condition; a display controller which causes, when the warm-up determiner determines that the warm-up of the colorimeter is necessary, a predetermined image, which indicates an attachment position of the colorimeter onto the display device, to be displayed on the display device; and a warm-up controller which starts, when the colorimeter is determined as being attached at the attachment position, the warm-up of the colorimeter by using the display device.

4 Claims, 18 Drawing Sheets

(56) References Cited

U.S. PATENT DOCUMENTS

2014/0312778 A1\* 10/2014 Matsui ................ H05B 45/24
                                                     315/151
2019/0195780 A1\* 6/2019 Zushi .................... G01J 3/10

\* cited by examiner

| DATE AND TIME | STATUS | TIME ELAPSED FROM POWER ON | AMBIENT TEMPERATURE | TEMPERATURE (NEAR LED) | TEMPERATURE (CENTER <1> OF DISPLAY) | TEMPERATURE (UPPER SIDE <2> RELATIVE TO CENTER OF DISPLAY) | TEMPERATURE (LEFT SIDE <3> RELATIVE TO CENTER OF DISPLAY) | TEMPERATURE (RIGHT SIDE <4> RELATIVE TO CENTER OF DISPLAY) | COLORIMETER INTERNAL TEMPERATURE |
|---|---|---|---|---|---|---|---|---|---|
| 2021/2/15 8:05 | AT START OF WARM-UP | 1 MIN | 8°C | 15°C | 8°C | 8°C | 9°C | 8°C | 8°C |
| 2021/2/15 8:10 | DURING WARM-UP | 6 MIN | 12°C | 30°C | 20°C | 20°C | 19°C | 19°C | 12°C |
| 2021/2/15 8:15 | DURING WARM-UP | 11 MIN | 12°C | 40°C | 30°C | 31°C | 29°C | 29°C | 20°C |
| 2021/2/15 8:19 | WARM-UP COMPLETED | 15 MIN | 15°C | 45°C | 34°C | 35°C | 33°C | 34°C | 21°C |
| 2021/2/15 8:20 | AT START OF CALIBRATION | 16 MIN | 15°C | 45°C | 35°C | 36°C | 34°C | 34°C | 22°C |
| 2021/2/15 8:24 | WB1 AT COMPLETION OF MEASUREMENT | 20 MIN | 18°C | 46°C | 35°C | 36°C | 34°C | 34°C | 22°C |
| 2021/2/15 8:30 | GAMMA 1 AT COMPLETION OF MEASUREMENT | 26 MIN | 18°C | 45°C | 37°C | 38°C | 35°C | 36°C | 22°C |
| 2021/2/15 8:33 | LUMINANCE 1 AT COMPLETION OF MEASUREMENT | 29 MIN | 18°C | 46°C | 37°C | 36°C | 35°C | 36°C | 24°C |
| 2021/2/15 8:39 | 3D-LUT AT COMPLETION OF MEASUREMENT | 35 MIN | 18°C | 47°C | 35°C | 36°C | 35°C | 36°C | 22°C |
| 2021/2/15 8:43 | WB2 AT COMPLETION OF MEASUREMENT | 39 MIN | 18°C | 45°C | 35°C | 36°C | 35°C | 36°C | 22°C |
| 2021/2/15 8:47 | GAMMA 2 AT COMPLETION OF MEASUREMENT | 43 MIN | 18°C | 45°C | 35°C | 36°C | 34°C | 34°C | 22°C |
| 2021/2/15 8:50 | LUMINANCE 2 AT COMPLETION OF MEASUREMENT | 46 MIN | 18°C | 45°C | 35°C | 36°C | 34°C | 34°C | 22°C |
| 2021/2/15 8:52 | AT COMPLETION OF MEASUREMENT | 48 MIN | 18°C | 45°C | 36°C | 36°C | 35°C | 36°C | 22°C |

FIG. 7

(PROCESSING AT TIME OF COLOR CALIBRATION)

FIRST STAGE
- DETERMINE WHETHER OR NOT WARM-UP OF COLORIMETER AND DISPLAY DEVICE IS NECESSARY

SECOND STAGE
- DISPLAY PREDETERMINED IMAGE INDICATING ATTACHMENT POSITION

THIRD STAGE
- WARM-UP EITHER OF OR BOTH OF DISPLAY DEVICE AND COLORIMETER

FOURTH STAGE
- START COLOR CALIBRATION

CONTROL DEVICE, DISPLAY DEVICE CONTROL SYSTEM, AND CONTROL METHOD OF CONTROL DEVICE

CROSS-REFERENCE TO RELATED APPLICATION

The present application claims priority from Japanese Application JP2021-163275, the content of which is hereby incorporated by reference into this application.

BACKGROUND OF THE INVENTION

1. Field of the Invention

The present disclosure relates to a control device, a display device control system, and a control method of a control device.

2. Description of the Related Art

There are cases where a colorimeter is used to perform calibration of colors displayed by a display device (i.e., color calibration). The colorimeter measures the displayed color, and the display device is adjusted (calibrated) so as to reduce a deviation from the target color and luminance. For example, a color calibration system disclosed in conventional technology is provided with: a display device in which a color sensor which detects the color temperature and illuminance of ambient light is arranged; a microcomputer; and a colorimeter which performs color measurement of a display screen of the display device from the outside. The microcomputer calculates a target value by using a calculation formula set in advance, and a detection result of the ambient light detected by the color sensor, and carries out color calibration of the display device such that a result of the color measurement by the colorimeter and the target value agree with each other.

In performing the color calibration, the colorimeter is attached to the display device. The color calibration takes a certain amount of time. The temperature of the colorimeter may be changed (raised) during the color calibration if heat emitted by the display device is received. Colorimeters are precision instrument. A change in temperature affects a result of the color measurement. When a colorimeter is cold at a start of color calibration, the temperature of the colorimeter may be changed significantly during the color calibration. If a change in the temperature is large, an error in the color measurement may become large. Also, some colorimeters require reinitialization (a redo of the calibration processing of the main unit of the colorimeter) if the amount of change in temperature from a start of the color calibration exceeds a permissible range. If the colorimeter is reinitialized, it is also necessary to redo the color calibration of the display device.

An object of one aspect of the present disclosure is to warm up a colorimeter by using a display device, and suppress a change in temperature of the colorimeter during calibration, thereby accurately measuring a color and preventing a redo of the color calibration.

SUMMARY OF THE INVENTION

A control device according to one aspect of the present disclosure is provided with: a warm-up determiner which determines, when color calibration of a display device is to be performed, whether or not a warm-up of a colorimeter is necessary on the basis of a predetermined condition; a display controller which causes, when the warm-up determiner determines that the warm-up of the colorimeter is necessary, a predetermined image, which indicates an attachment position of the colorimeter onto the display device, to be displayed on the display device; and a warm-up controller which starts, when the colorimeter is determined as being attached at the attachment position, the warm-up of the colorimeter by using the display device.

A display device control system according to another aspect of the present disclosure is provided with a display device and a control device, in which the display device control system includes: a warm-up determiner which determines, when color calibration of the display device is to be performed, whether or not a warm-up of a colorimeter is necessary on the basis of a predetermined condition; a display controller which causes, when the warm-up determiner determines that the warm-up of the colorimeter is necessary, a predetermined image, which indicates an attachment position of the colorimeter onto the display device, to be displayed on the display device; and a warm-up controller which starts, when the colorimeter is determined as being attached at the attachment position, the warm-up of the colorimeter by using the display device.

A control method of a control device according to yet another aspect of the present disclosure includes: determining, when color calibration of a display device is to be performed, whether or not a warm-up of a colorimeter is necessary on the basis of a predetermined condition; causing, when the warm-up of the colorimeter is determined as being necessary, a predetermined image, which indicates an attachment position of the colorimeter in the display device, to be displayed on the display device; determining whether or not the colorimeter is attached at the attachment position; and starting, when the colorimeter is determined as being attached at the attachment position, the warm-up of the colorimeter by using the display device.

BRIEF DESCRIPTION OF THE DRAWINGS

FIG. 6 is a diagram illustrating an example of history data according to an embodiment.

FIG. 7 is a diagram illustrating an outline of processing related to color calibration according to an embodiment.

DETAILED DESCRIPTION OF THE INVENTION

Figure 1:
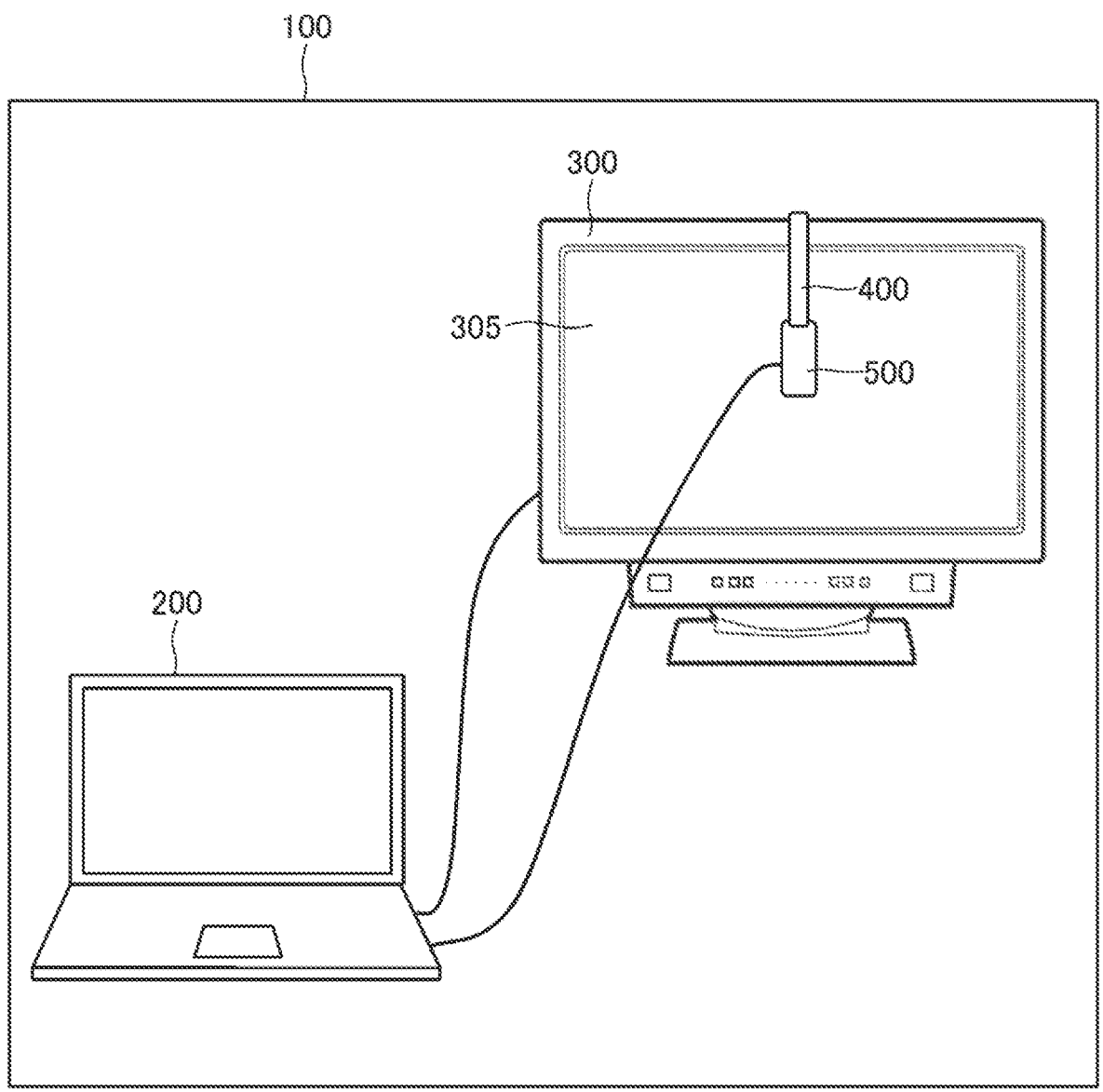
FIG. 1 is a diagram illustrating an example of a display device control system according to an embodiment.

A display device control system 100 and a control device 200 according to the present disclosure will be described below with reference to the accompanying drawings. In the drawings, identical or equivalent elements are indicated by the same symbols.

Display Device Control System 100

First, with reference to FIG. 1, an example of the display device control system 100 will be described, FIG. 1 is a diagram illustrating an example of the display device control system 100 according to an embodiment.

As illustrated in FIG. 1, the display device control system 100 is provided with the control device 200 and a display device 300. The display device control system 100 may include a colorimeter 500.

For example, the control device 200 is a computer (PC). FIG. 1 illustrates a notebook PC as an example of the control device 200. The control device 200 includes calibration software CS1 installed thereon (see FIG. 2). The calibration software CS1 includes a program used by the control device 200 to control the display device 300 and the colorimeter 500, and to perform color calibration.

The display device 300 is a device which displays video images. For example, the display device 300 can display a video image based on a video signal output by the control device 200. Also, the display device 300 may receive a broadcast and display a video image. Further, the display device 300 may display a video image on the basis of a video signal stored in a storage device.

The colorimeter 500 measures the color and luminance of an object to be measured. The colorimeter 500 may be referred to as a colorimetric sensor or a chromatometer. In the present specification, the colorimeter 500 measures the color and luminance of an image (a video image) that the display device 300 displays. The colorimeter 500 outputs a value (a measured value) corresponding to the color and luminance of the object to be measured. For example, the colorimeter 500 outputs each value of (x, y, Y) as the measured value.

In performing the color calibration of the display device 300, the colorimeter 500 is attached to the display device 300. In performing the color calibration, the colorimeter 500 measures the color of the video image (image) that the display device 300 displays.

At one side of the colorimeter 500, an aperture (an opening portion), which is for introducing light emitted by the object to be measured, or light reflected from the object to be measured into the colorimeter 500, is provided. The colorimeter 500 performs the measurement on the basis of the light from the aperture. An area facing the aperture is the measurement area of the colorimeter 500. When the color of the video image displayed by the display device 300 is to be measured, the aperture is directed toward a screen of the display device 300. For example, a plane where the aperture of the colorimeter 500 is provided and the screen are brought into contact with each other.

By means of an attachment instrument 400, the colorimeter 500 is attached to the display device 300. The attachment instrument 400 illustrated in FIG. 1 is belt-shaped or string-shaped. One end of the attachment instrument 400 in a longitudinal direction thereof is connected to an end portion of the colorimeter 500, The other end of the attachment instrument 400 in the longitudinal direction thereof is hooked on the back side of the display device 300. The attachment instrument 400 is brought to hook over a bezel at an upper part of the display device 300. As a result, the colorimeter 500 can be hung.

Note that the attachment position of the colorimeter 500 relative to the screen of the display device 300 is adjustable.

Control Device 200

Figure 2:
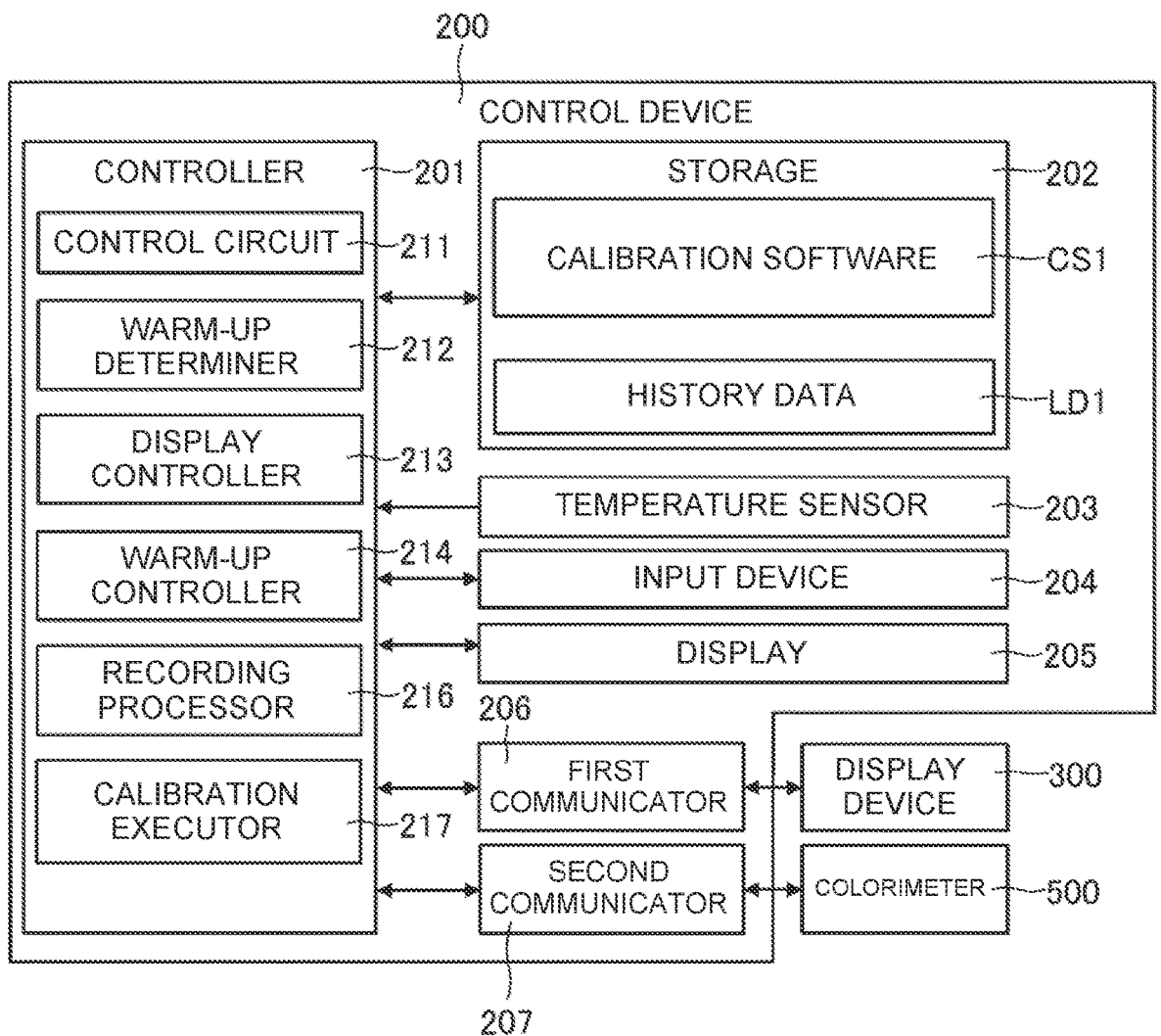
FIG. 2 is a diagram illustrating an example of a control device according to an embodiment.

Next, an example of the control device 200 will be described with reference to FIG. 2. FIG. 2 is a diagram illustrating an example of the control device 200 according to an embodiment.

The control device 200 is provided with a controller 201, a storage 202, a temperature sensor 203, an input device 204, a display 205, a first communicator 206, and a second communicator 207.

The controller 201 is provided with a control circuit 211. The control circuit 211 is a processor, and is, for example, a CPU. For example, the storage 202 includes a RAM, a ROM, and storage. The storage is either of or both of a hard disk and a solid state drive. The control circuit 211 executes a program and software stored in the storage 202, and operates as the controller 201.

As illustrated in FIG. 2, for example, the controller 201 is provided with a warm-up determiner 212, a display controller 213, a warm-up controller 214, a recording processor 216, and a calibration executor 217. The warm-up determiner 212, the display controller 213, the warm-up controller 214, the recording processor 216, and the calibration executor 217 are functionally implemented as the control circuit 211 (the processor) executes the program and software stored in the storage 202. Note that the controller 201 may have a circuit (hardware) which performs the processing of the warm-up determiner 212, the display controller 213, the warm-up controller 214, the recording processor 216, and the calibration executor 217.

The temperature sensor 203 is a sensor for detecting an ambient temperature (room temperature) of a room in which the control device 200 (the display device control system 100 and the display device 300) is installed. The control circuit 211 detects the ambient temperature on the basis of an output of the temperature sensor 203. The input device 204 is a device for operating the control device 200 and making the setting of the same. For example, the input device 204 may be a mouse or a keyboard. The display 205 is a PC display which displays a setting screen and an operation screen of the control device 200.

The first communicator 206 communicates with the display device 300. The first communicator 206 may communicate with the display device 300 by wired communication. In this case, the first communicator 206 is provided with a communication control circuit, a communication memory, and a connector. For example, the first communicator 206 and the display device 300 perform communication conforming to at least one standard of the standards including RS-232C, USB, wired LAN, and HDMI (registered trademark) CEC. Alternatively, the first communicator 206 may communicate with the display device 300 by wireless communication. In this case, the first communicator 206 is provided with a communication control circuit, a communication memory, and an antenna. For example, the first communicator 206 and the display device 300 may perform communication conforming to a wireless LAN standard.

The second communicator 207 communicates with the colorimeter 500. The second communicator 207 may communicate with the colorimeter 500 by wired communication. In this case, the second communicator 207 is provided with a communication control circuit, a communication memory, and a connector. For example, the second communicator 207 and the colorimeter 500 perform communication conforming to at least one standard of the standards including USB and wired. LAN. Alternatively, the second communicator 207 may communicate with the colorimeter 500 by wireless communication. In this case, the second communicator 207 is provided with a communication control circuit, a communication memory, and an antenna. For example, the second communicator 207 and the colorimeter 500 may perform communication conforming to a wireless LAN standard.

Display Device 300

Figure 3:
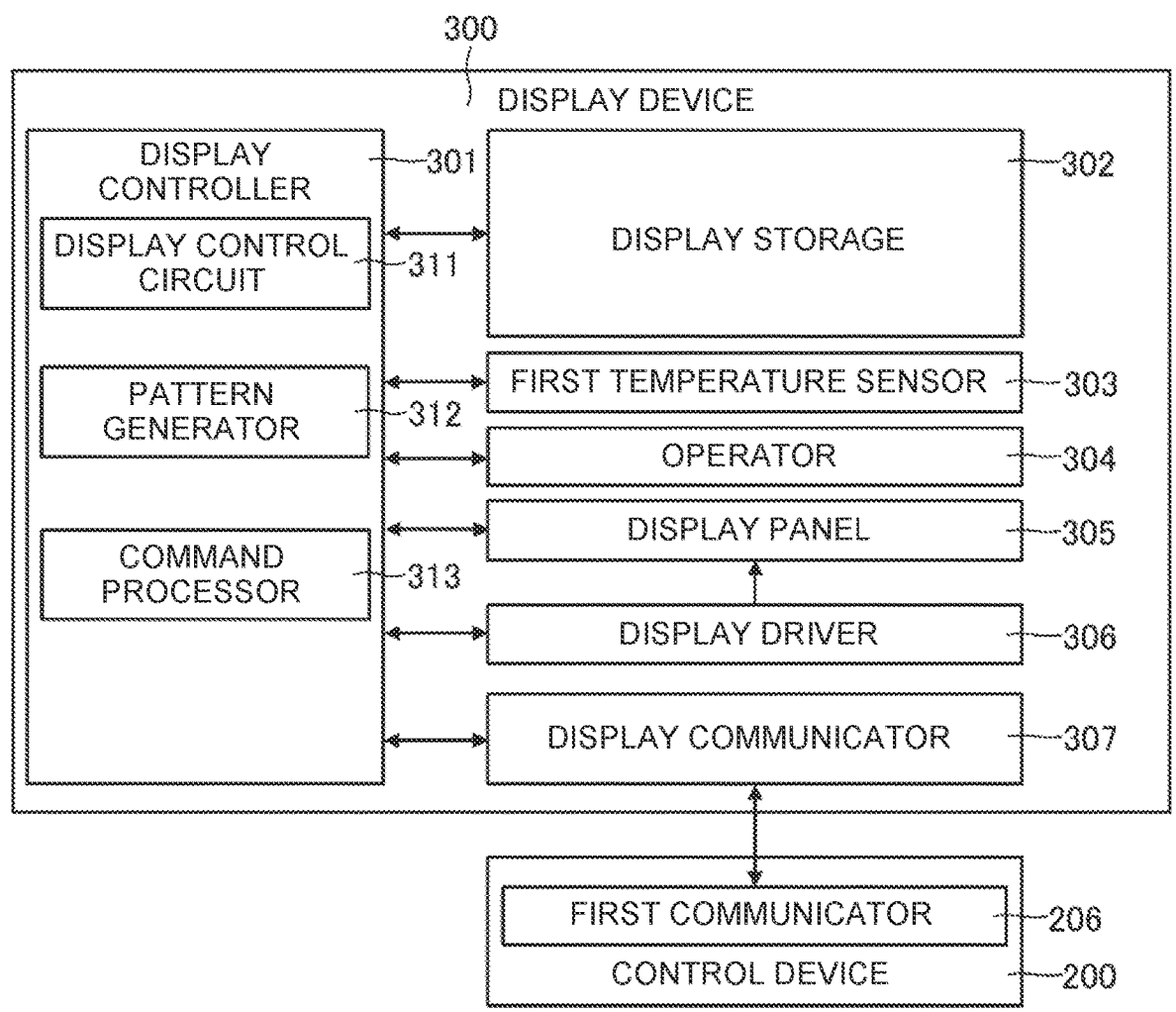
FIG. 3 is a diagram illustrating an example of a display device according to an embodiment.
Figure 4:
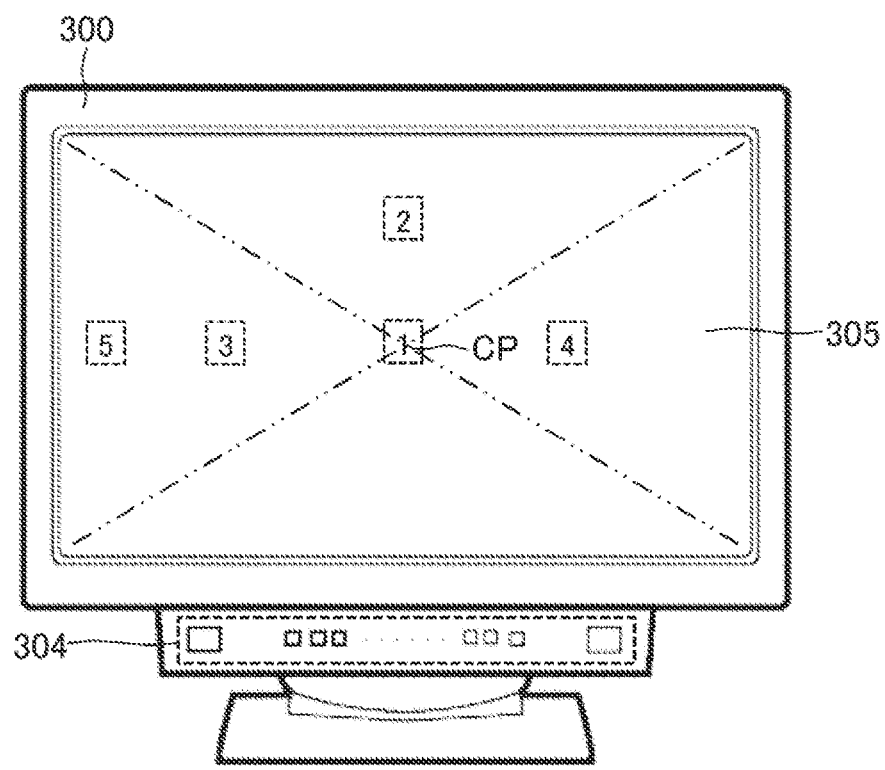
FIG. 4 is a diagram illustrating an example of places of installation of a first temperature sensor according to an embodiment.

Next, an example of the display device 300 will be described with reference to FIGS. 3 and 4. FIG. 3 is a diagram illustrating an example of the display device 300 according to an embodiment. FIG. 4 is a diagram illustrating an example of places of installation of a first temperature sensor 303 according to an embodiment.

The display device 300 is provided with a display controller 301, a display storage 302, the first temperature sensor 303, an operator 304, a display panel 305, a display driver 306, and a display communicator 307.

The display controller 301 is provided with a display control circuit 311. For example, the display control circuit 311 may be an integrated processing circuit (a processor) for the display device 300, which performs control and calculations. For example, the display storage 302 includes a RAM and a ROM. The display control circuit 311 executes a program stored in the display storage 302, and operates as the display controller 301.

As illustrated in FIG. 3, for example, the display controller 301 is provided with a pattern generator 312 and a command processor 313. The pattern generator 312 and the command processor 313 are functionally implemented as the display control circuit 311 (the processor) executes the program and software stored in the display storage 302. Note that the display controller 301 may have a circuit (hardware) which performs the processing of the pattern generator 312 and the command processor 313.

The first temperature sensor 303 is a sensor for detecting the temperature inside the display device 300. As illustrated in FIG. 4, a plurality of first temperature sensors 303 may be provided. For the sake of convenience, only one first temperature sensor 303 is illustrated in FIG. 3. A rectangle indicated by a dashed line in FIG. 4 represents an example of the installation position of the first temperature sensor 303. FIG. 4 illustrates an example in which five first temperature sensors 303 are arranged. Note that the number of first temperature sensors 303 to be installed may be less than five, or may be six or more. FIG. 4 illustrates an example in which the first temperature sensor 303 is arranged at each of the inner part with reference to a center point CP (the rectangle numbered 1), on a screen (a display area) of the display panel 305; the inner part on the upper side with reference to the center point CP (the rectangle numbered 2); the inner part on the left, side with reference to the center point CP (the rectangle numbered 3); the inner part on the right side with reference to the center point CP (the rectangle numbered 4); and the vicinity of a part of backlights (the rectangle numbered 5). On the basis of outputs of the first temperature sensors 303, the display control circuit 311 recognizes (detects) the temperatures at points of installation of the first temperature sensors 303. The display control circuit 311 can detect temperatures of a plurality of points on the display device 300.

The operator 304 is a device for operating the display device 300 and making the setting of the same. For example, the operator 304 is at least one of a remote controller and a button provided on a body of the display device 300. The operator 304 receives an operation to change the setting of the display device 300.

The display panel 305 includes, for example, a liquid crystal panel and a backlight. For example, the liquid crystal panel includes a pair of glass substrates. One of the pair of glass substrates can be used as an array substrate, and the other one of the pair of glass substrates can be used as a color filter substrate. The array substrate is provided with a plurality of pixel electrodes. The alignment of liquid crystals is controlled in units of pixel electrodes (sub-pixels). For example, one pixel includes red (E), green (G), and blue (B) sub-pixels. For example, for each pixel, red (R), green (G), and blue (B) color filters are provided on the color filter substrate. As seen in a direction perpendicular to the plane of the glass substrates, one color filter is arranged at a position overlapping each of the pixel electrodes of the array substrate. A liquid crystal layer (not shown) including liquid crystal molecules is sealed between the pair of glass substrates. The display driver 306 applies, on the basis of a video signal, a drive voltage to the pixel electrode (the liquid crystal layer) of each sub-pixel. The orientation of the liquid crystal molecules in the liquid crystal layer is changed by the application of the drive voltage. The display driver 306 controls the magnitude of a voltage to be applied to the pixel electrode, and increases or decreases the transmittance of light emitted from a light source (the backlight) for each sub-pixel so that the luminance of the sub-pixels can be adjusted. In other words, the display driver 306 can adjust the luminance of each sub-pixel.

Note that the display panel 305 may be an organic EL panel, instead of a liquid crystal panel. Also in this case, the display driver 306 can adjust the luminance of each sub-pixel.

The display communicator 307 communicates with the control device 200 (the first communicator). The display communicator 307 may communicate with the control device 200 by wired communication. In this case, the display communicator 307 is provided with a communication control circuit, a communication memory, and a connector. For example, the display communicator 307 and the control device 200 perform communication conforming to at least one standard of the standards including RS-232C, USB, wired LAN, and HDMI (registered trademark) CEC. Alternatively, the display communicator 307 may communicate with the control device 200 by wireless communication. In this case, the display communicator 307 is provided with a communication control circuit, a communication memory, and an antenna. For example, the display communicator 307 and the control device 200 may perform communication conforming to a wireless LAN standard.

Colorimeter 500

Figure 5:
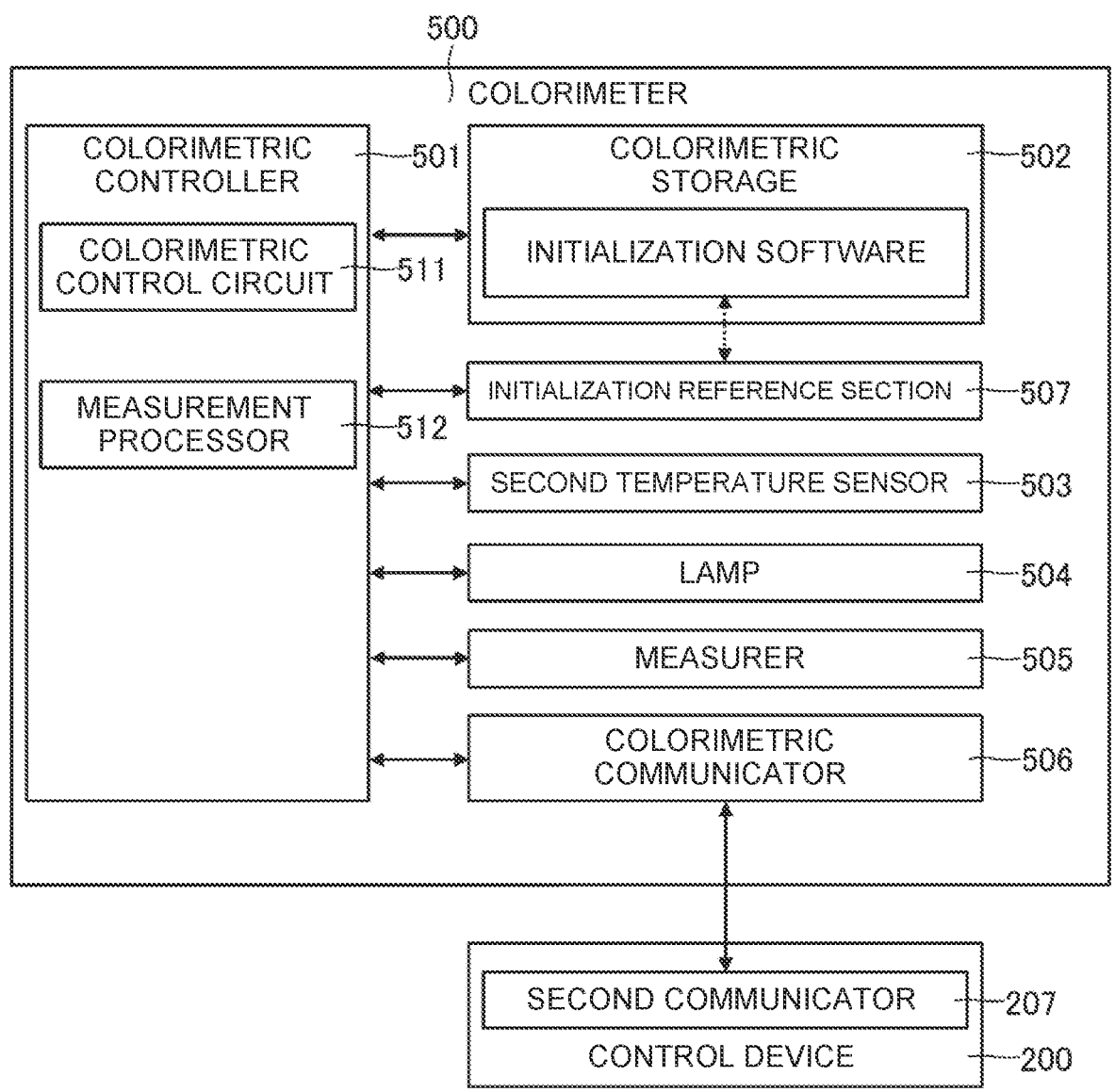
FIG. 5 is a diagram illustrating an example of a colorimeter according to an embodiment.

Next, an example of the colorimeter 500 will be described with reference to FIG. 5. FIG. 5 is a diagram illustrating an example of the colorimeter 500 according to an embodiment.

The colorimeter 500 is provided with a colorimetric controller 501, a colorimetric storage 502, a second temperature sensor 503, a lamp 504, a measurer 505, a colorimetric communicator 506, and an initialization reference section 507.

The colorimetric controller 501 is provided with a colorimetric control circuit 511. For example, the colorimetric control circuit 511 is a processor. For example, the colorimetric storage 502 includes a RAM and a ROM. The colorimetric control circuit 511 executes a program stored in the colorimetric storage 502, and operates as the colorimetric controller 501. As illustrated in FIG. 5, for example, the colorimetric controller 501 is provided with a measurement processor 512. The measurement processor 512 is functionally implemented as the colorimetric control circuit 511 executes the program and software stored in the colorimetric storage 502. Note that the colorimetric controller 501 may have a circuit (hardware) which performs the processing of the measurement processor 512.

The second temperature sensor 503 is a sensor for detecting the temperature inside the colorimeter 500. On the basis of an output of the second temperature sensor 503, the colorimetric control circuit 511 recognizes (detects) the temperature inside the colorimeter 500. The lamp 504 irradiates the object to be measured with light. For example, the lamp 504 is an LED. The colorimetric control circuit 511 can control turning on or turning off of the lamp 504. For example, when initialization of the colorimeter 500 is to be performed, the colorimetric control circuit 511 causes the lamp 504 to be turned on. The initialization of the colorimeter 500 refers to color calibration (calibration processing) of the main unit of the colorimeter, which is performed by, for example, measuring whiteness of a white reference plate provided in the colorimeter 500.

The measurer 505 measures the color of the object to be measured. The measurer 505 includes, for example, a light collection channel, a light guide, a wavelength-selective photoelectric converter, and a signal processing circuit. For example, the light guide is an optical fiber or a photoconductive rod. The wavelength-selective photoelectric converter includes, for example, a diffraction grating and a detector array. For example, the detector array includes a diode line.

The light collection channel includes, for example, a lens. The light collection channel captures light emitted by or reflected from the object to be measured, which is the light that has passed through the aperture and is within a predetermined capture angle range. The captured light is guided to the light guide. The light guide guides the captured light to the diffraction grating. Individual spectral elements of the captured light reach the detector array. The detector array outputs, for each wavelength of the light, an electrical signal whose magnitude corresponds to the amount (intensity) of the light. The signal processing circuit processes the electrical signal output by the detector array. For example, the signal processing circuit obtains, as the measured value, digital values indicating the hue, color saturation, and luminance of the object to be measured. The colorimeter 500 outputs a measured value corresponding to the measured color. Note that the configuration of the measurer 505 is not limited to the above configuration.

The colorimetric communicator 506 communicates with the control device 200 (the second communicator 207). The colorimetric communicator 506 may communicate with the control device 200 by wired communication. In this case, the colorimetric communicator 506 is provided with a communication control circuit, a communication memory, and a connector. For example, the colorimetric communicator 506 and the second communicator 207 perform communication conforming to at least one standard of the standards including USB and wired LAN. Alternatively, the colorimetric communicator 506 may communicate with the second communicator 207 by wireless communication. In this case, the colorimetric communicator 506 is provided with a communication control circuit, a communication memory, and an antenna. For example, the colorimetric communicator 506 and the second communicator 207 may perform communication conforming to a wireless LAN standard. The initialization reference section 507 is a member, which is in a reference color, used for the initialization of the colorimeter 500 described above (i.e., the color calibration of the main unit of the colorimeter), and is, for example, a white reference plate built into the colorimeter 500 in advance.

Generation of History Data LD1

Next, an example of generation of history data LD1 will be described with reference to FIG. 6. FIG. 6 is a diagram illustrating an example of the history data LD1 according to an embodiment.

The recording processor 216 of the controller 201 generates the history data LD1 The history data LD1 corresponds to data indicating histories of a temperature distribution of the display device 300, and histories of the internal temperature of the colorimeter 500. The recording processor 216 sends a temperature detection command to the display device 300 and the colorimeter 500. On the basis of the above command, the display device 300 and the colorimeter 500 detect the temperature. Also, the recording processor 216 sends a command for transmission of the detected temperature to the display device 300 and the colorimeter 500. On the basis of the above command, the display device 300 and the colorimeter 500 transmit the detected temperature to the control device 200. The recording processor 216 makes the received temperature data be stored, as the history data LD1, in the storage 202 in a non-volatile manner. FIG. 6 shows an example of the history data LD1.

The recording processor 216 may send the temperature detection command and the detected temperature transmission command to the display device 300 and the colorimeter 500 at predetermined intervals. Alternatively, the recording processor 216 may send the temperature detection command and the detected temperature transmission command to the display device 300 and the colorimeter 500 for each event that is determined in advance. For example, at such times as when a warm-up of the display device 300 is started, when the warm-up is ended, when color calibration is started, when adjustment for one item of the color calibration is completed, and when the color calibration is ended, the recording processor 216 may send the temperature detection command and the detected temperature transmission comp and to the display device 300 and the colorimeter 500.

As indicated in FIG. 6, the recording processor 216 may include the date and time of history recordation in the history data LD1. In addition, the recording processor 216 may include the state (status) of the display device 300 at the time of the recording of the history in the history data LD1. Further, the recording processor 216 may include, for each date and time of the history recordation, a time elapsed from when the display device 300 was powered on, in the history data LD1. Furthermore, the recording processor 216 may include a first detected temperature that has been detected from a start of a warm-up to an end of the warm-up, and from a start of color calibration to an end of the color calibration, in the history data LD1. Furthermore, the recording processor 216 may include a second detected temperature that has been detected from a start of a warm-up to an end of the warm-up, and from a start of color calibration to an end of the color calibration, in the history data LD1.

Color Calibration of Display Device 300

The luminance and color of each pixel of the display device 300 change over time. To reproduce the color accurately, preferably, color calibration (color calibration processing) should be performed at fixed intervals. In the color calibration, adjustment of various items, such as luminance, color gamut, color temperature, gamma, and 3D-LUT, is performed. For this reason, the color calibration may take a long time.

For example, room temperature is low in the morning during the winter season. The colorimeter 500 and the display device 300 may be cold. During color calibration, the colorimeter 500 is in contact with the display device 300. During the color calibration, the colorimeter 500 receives heat emitted by the display device 300. After the color calibration has been started, the temperature of the colorimeter 500 may rise, and the temperature of the colorimeter 500 may be changed significantly. The colorimeter 500 is delicate, and is precision equipment. A change in temperature of the colorimeter 500 affects the accuracy of a result of color measurement. Also, when there has been a great change in temperature, depending on the colorimeter 500, initialization of the colorimeter 500 may be needed again. When initialization processing of the colorimeter 500 is re-executed, the color calibration of the display device 300 is interrupted in the middle. As a result, a redo of the color calibration of the display device 300 may be needed in some cases.

Processing at the Time of Color Calibration

Next, an outline of processing related to color calibration of the display device 300 will be described with reference to FIG. 7. FIG. 7 is a diagram illustrating an outline of processing related to color calibration according to an embodiment.

In order to prevent a redo of the color calibration, the display device control system 100 performs processing of a plurality of stages.

(1) First Stage

A first stage is the stage in which the control device 200 determines, on the basis of a predetermined condition, whether or not a warm-up of the colorimeter 500 is necessary, and whether or not a warm-up of the display device 300 is necessary, before starting color calibration (the details will be described later with reference to FIG. 8).

(2) Second Stage

A second stage is the stage in which, when it is determined that the warm-up of the colorimeter 500 is necessary, the control device 200 displays a predetermined image P1 indicating an attachment position on the display device 300 (the details will be described later with reference to FIGS. 9 to 11). If it is determined that a warm-up of the colorimeter 500 is not necessary, the control device 200 skips the processing of the second stage.

(3) Third Stage

A third stage is the stage in which, when it is determined that the warm-up of at least one of the colorimeter 500 and the display device 300 is necessary, the control device 200 controls the warm-up (the details will be described later with reference to FIGS. 12 to 15). If it is determined that a warm-up is not necessary for both the colorimeter 500 and the display device 300, the control device 200 skips the processing of the third stage.

(4) Fourth Stage

Figure 17:
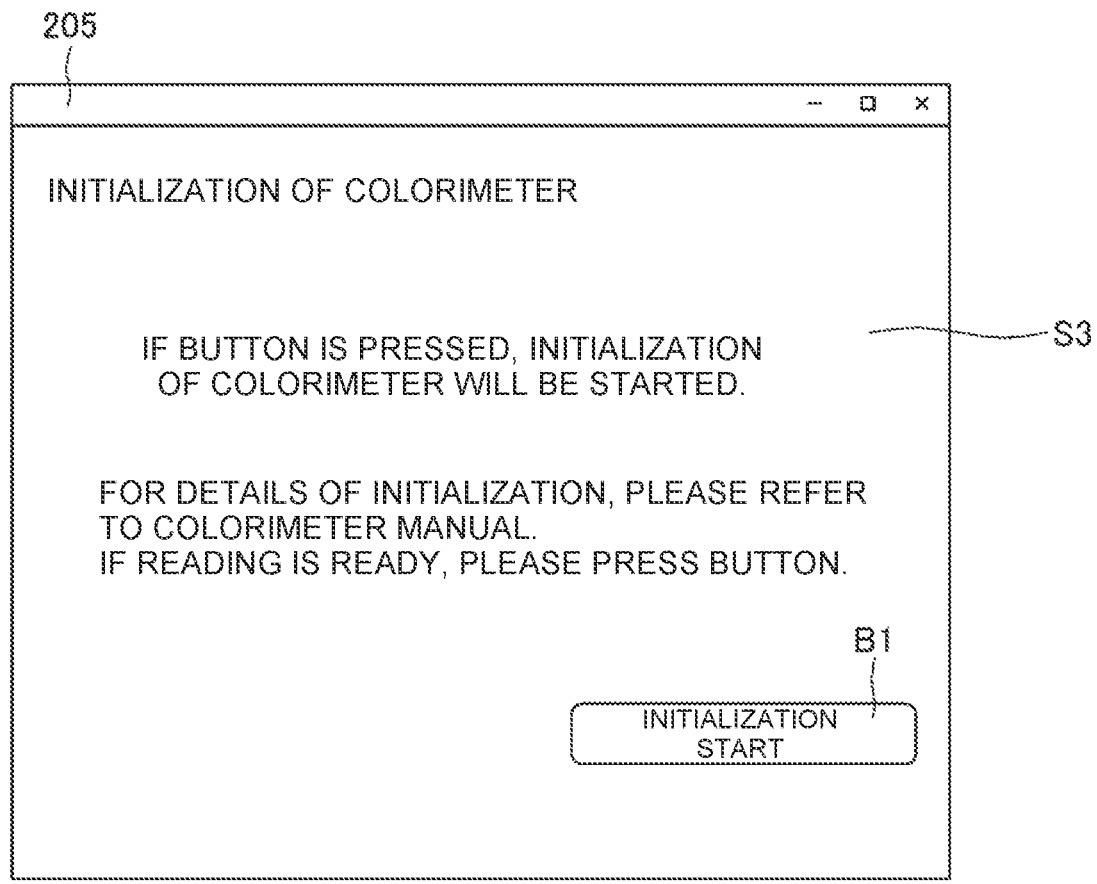
FIG. 17 is a diagram illustrating an example of a third operation screen according to an embodiment.
Figure 18:
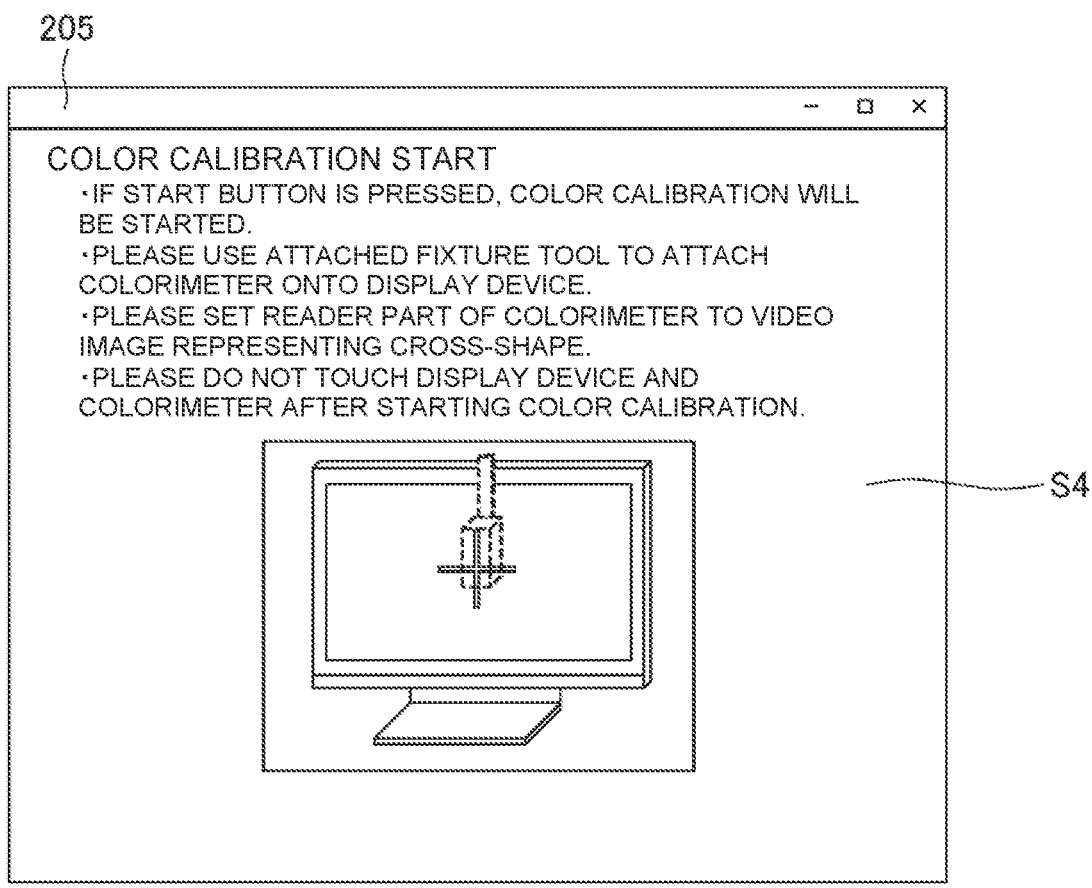
FIG. 18 is a diagram illustrating an example of a fourth operation screen according to an embodiment.

After the warm-up has been ended, the control device 200 starts the color calibration of the display device 300 (the details will be described later with reference to FIGS. 16 to 18).

As described above, the warm-up determiner 212 of the control device 200 determines, on the basis of the predetermined condition, whether or not a warm-up of the colorimeter 500 is necessary, when performing color calibration of the display device 300. When the warm-up determiner 212 determines that the warm-up of the colorimeter 500 is necessary, the display controller 213 causes the predetermined image P1 indicating the attachment position of the colorimeter 500 onto the display device 300 to be displayed on the display device 300. When the warm-up controller 214 determines that the colorimeter 500 is attached at the attachment position, the warm-up controller 214 starts the warm-up of the colorimeter 500 by using the display device 300. Thus, it is possible to warm the colorimeter 500 by using the display device 300. The color calibration can be started after sufficiently warming the colorimeter 500. Even if heat is received from the display device 300 during the color calibration, a great change in temperature of the colorimeter 500 can be suppressed. Consequently, during the color calibration, the color of a video image displayed by the display device 300 can be accurately measured. Also, it is possible to suppress the occurrence of a circumstance in which the colorimeter 500 must be reinitialized due to a great change in temperature of the colorimeter 500. The occurrence of a circumstance of having to redo the color calibration can be prevented.

In the color calibration of the display device 300, a number of processes are performed as processing. Therefore, for the sake of convenience, processing related to the color calibration of the display device 300 will be described with reference to each stage indicated in FIG. 7.

First Stage

Next, with reference to FIG. 8, an example of the processing of the above-described first stage will be described (see FIG. 7). The processing of the first stage corresponds to a stage in which the control device 200 determines whether or not a warm-up of the display device 300 and the colorimeter 500 is necessary before starting the color calibration. FIG. 8 is diagram illustrating an example of a flow of the processing of the first stage according to an embodiment.

First, when the color calibration of the display device 300 is to be performed, a user operates the control device 200, and activates the calibration software CS1. In FIG. 8, "START" corresponds to the point of time when the calibration software CS1 is activated. The user powers on the display device 300 and the colorimeter 500, so that the display device 300 and the colorimeter 500 are activated. The display device 300 and the colorimeter 500 are in such a state that they can communicate with the control device 200.

First, the warm-up determiner 212 (the control circuit 211) detects the ambient temperature (room temperature), on the basis of an output of the temperature sensor 203 (step S801). Next, the warm-up determiner 212 orders the display device 300 and the colorimeter 500 to measure the temperature (step S802). Specifically, the warm-up determiner 212 orders the first communicator 206 to send, toward the display device 300, a temperature detection command for temperature detection using the first temperature sensor 303.

Also, the warm-up determiner 212 orders the second communicator 207 to send, toward the colorimeter 500, a temperature detection command for temperature detection using the second temperature sensor 503.

When the temperature detection command is received, the command processor 313 detects the temperature, on the basis of an output of each of the first temperature sensors 303. Further, the command processor 313 orders the display communicator 307 to send, toward the control device 200, the detected temperatures. Also, when the temperature detection command is received, the colorimetric controller 501 detects the temperature, on the basis of an output of the second temperature sensor 503. Further, the colorimetric controller 501 orders the colorimetric communicator 506 to send, toward the control device 200, the detected temperature.

As a result, the control device 200 acquires the temperatures measured by the display device 300 and the colorimeter 500 (step S803). Specifically, the first communicator 206 communicates with the display device 300 including the first temperature sensors 303, and acquires the first detected temperature indicating the temperature of the display device 300 detected by the first temperature sensors 303, Further, the second communicator 207 communicates with the colorimeter 500 including the second temperature sensor 503, and acquires the second detected temperature indicating the temperature of the colorimeter 500 detected by the second temperature sensor 503. Note that the recording processor 216 may make the acquired first detected temperature and second detected temperature be stored, as the history data LD1, in the storage 202 in a non-volatile manner.

Then, the warm-up determiner 212 determines whether or not a warm-up of the colorimeter 500 is necessary (step S804). The warm-up determiner 212 may determine whether or not a warm-up of the colorimeter 500 is necessary on the basis of a first condition, a second condition, and a third condition described below.

(First Condition) A temperature difference obtained by subtracting the second detected temperature from the first detected temperature is greater than or equal to a first predetermined temperature.

The first temperature sensor 303 is provided at a plurality of places. With respect to the temperatures respectively detected by the first temperature sensors 303, the warm-up determiner 212 may use any one of the average value, median value, maximum value, and minimum value, as the first detected temperature. Also, the first predetermined temperature is determined in advance. For example, the first predetermined temperature is a temperature that is greater than or equal to 10 degrees Celsius and less than 20 degrees Celsius. For example, the first predetermined temperature may be 15 degrees Celsius. When the colorimeter 500 is not warmed, a temperature difference between the display device 300 and the colorimeter 500 may be large. In a case where the first condition is satisfied, it is possible that the temperature of only the display device 300 may be raised. Meanwhile, if the colorimeter 500 is warmed, the temperature of the display device 300 (the first detected temperature) and the temperature of the colorimeter 500 (the second detected temperature) approximate each other.

(Second Condition) A temperature difference obtained by subtracting the detected ambient temperature (room temperature) from the second detected temperature is less than a second predetermined temperature. The second predetermined temperature is determined in advance. For example, the second predetermined temperature corresponds to a value that is greater than or equal to 2 degrees Celsius and less than 10 degrees Celsius. For example, the second predetermined temperature may be 5 degrees Celsius. When the colorimeter 500 is not warmed, the temperature of the colorimeter 500 and the ambient temperature indicate values that are close to each other. In a case where the second condition is satisfied, it is possible that the colorimeter 500 may not be warmed. Meanwhile, in a case where the colorimeter 500 is placed in a warm room, for example, it is possible that the colorimeter 500 may already be sufficiently warm. If the colorimeter 500 is sufficiently warmed, and the temperature of the colorimeter 500 is sufficiently higher than the ambient temperature, the temperature difference exceeds the second predetermined temperature.

(Third Condition) The second detected temperature is less than a third predetermined temperature.

The third predetermined temperature indicates the lowest temperature of the colorimeter 500 when the colorimeter 500 is used. In other words, the third predetermined temperature corresponds to the minimum value of a recommended use temperature range for the colorimeter 500. For example, the third predetermined temperature is a temperature that is greater than or equal to 10 degrees Celsius and less than 20 degrees Celsius. For example, the third predetermined temperature may be 15 degrees Celsius. In a case where the colorimeter 500 is placed in a cold room, the third condition may be satisfied. When the third condition is satisfied, there is a possibility that a redo of the color calibration may be needed by being affected by heat of the display device 300 after the color calibration has been started.

For example, if at least one of the first condition, the second condition, and the third condition is satisfied, the warm-up determiner 212 determines that a warm-up of the colorimeter 500 is necessary (Yes in step S804). Meanwhile, if none of the first condition, the second condition, and the third condition is satisfied, the warm-up determiner 212 determines that a warm-up of the colorimeter 500 is not necessary (No in step S804).

In this way, the warm-up determiner 212 determines, on the basis of the acquired first detected temperature, whether or not a warm-up of the display device 300 is necessary, before starting color calibration of the display device 300. Also, the warm-up determiner 212 may determine, on the basis of the acquired second detected temperature, whether or not a warm-up of the colorimeter 500 is necessary, before starting the color calibration of the display device 300.

Further, if a temperature difference obtained by subtracting the second detected temperature from the acquired first detected temperature is greater than or equal to the first predetermined temperature, the warm-up determiner 212 determines that a warm-up of the colorimeter 500 is necessary. Furthermore, if a temperature difference obtained by subtracting the ambient temperature, which has been detected by the temperature sensor 203, from the acquired second detected temperature is less than the second predetermined temperature, the warm-up determiner 212 may determine that a warm-up of the colorimeter 500 is necessary. It is thereby possible to accurately determine whether or not a warm-up of the colorimeter 500 is necessary, on the basis of the ambient temperature, the temperature of the display device 300, and the temperature of the colorimeter 500. In addition, only when the warm-up of the colorimeter 500 is necessary, the predetermined image P1 can be displayed on the display device 300. It is sufficient if at least one of the control device 200 and the display device 300 is provided with the temperature sensor 203.

If it is determined that a warm-up of the colorimeter 500 is necessary (Yes in step S804), the warm-up determiner 212 determines, on the basis of a fourth condition and a fifth condition, whether or not a warm-up of the display device 300 is necessary (step S805).

(Fourth Condition) A temperature difference obtained by subtracting the detected ambient temperature (room temperature) from the first detected temperature is less than a fourth predetermined temperature. The first temperature sensor 303 is provided at a plurality of places. With respect to the temperatures respectively detected by the first temperature sensors 303, the warm-up determiner 212 may use any one of the average value, median value, maximum value, and minimum value, as the first detected temperature. The fourth predetermined temperature is determined in advance. For example, the fourth predetermined temperature is a temperature that is greater than or equal to 15 degrees Celsius and less than 25 degrees Celsius. For example, the fourth predetermined temperature may be 20 degrees Celsius. When the internal temperature of the display device 300 is sufficiently higher than the ambient, temperature, the display device 300 is considered to be sufficiently warm. Meanwhile, when a warm-up of the display device 300 is not sufficient, the first detected temperature indicates a value that is close to the ambient temperature. In a case where the fourth condition is satisfied, it is possible that the display device 300 may not be sufficiently warmed.

(Fifth Condition) Time elapsed from when the display device 300 was powered on is less than a first predetermined time. The first predetermined time is determined in advance. For example, the first predetermined time corresponds to a value that is greater than or equal to 10 minutes and less than 20 minutes. For example, the first predetermined time may lie 15 minutes. When the display device 300 is powered on, the backlight (LED) of the display device 300 is lit and the temperature is increased. Therefore, if the time elapsed from when the display device 300 was powered on is long, the temperature inside the display device 300 may be sufficiently high. Conversely, in a case where the fifth condition is satisfied, the time elapsed from when the display device 300 was powered on is short. Thus, it is possible that the display device 300 may not be sufficiently warmed.

Color calibration of the display device 300 must be performed in such a state that the luminance is stable. However, when the display device 300 is not sufficiently warmed, the luminance of the display device 300 is not stable. Therefore, it is necessary to warm the display device 300 and stabilize the luminance. Thus, for example, if at least one of the fourth condition and the fifth condition is satisfied, the warm-up determiner 212 determines that a warm-up of the display device 300 is necessary (Yes in step S805). In this case, the warm-up determiner 212 determines that a warm-up of the display device 300 and the colorimeter 500 is to be performed (step S5806→END).

Meanwhile, if neither the fourth condition nor the fifth condition is satisfied, the warm-up determiner 212 determines that a warm-up of the display device 300 is not necessary (No in step S805). In this case, the warm-up determiner 212 determines that only the colorimeter 500 is to be warmed up (step S807 END).

Also, when it is determined that a warm-up of the colorimeter 500 is not necessary (No in step S804), the warm-up determiner 212 determines whether or not a warm-up of the display device 300 is necessary (step S808). On the basis of the fourth condition and the fifth condition, the warm-up determiner 212 determines whether or not a warm-up of the display device 300 is necessary (step 808).

If at least one of the fourth condition and the fifth condition is satisfied, the warm-up determiner 212 determines that a warm-up of the display device 300 is necessary (Yes in step S808). In this case, the warm-up determiner 212 determines that only the display device 300 is to be warmed up (step S809→END).

Meanwhile, if neither the fourth condition nor the fifth condition is satisfied, the warm-up determiner 212 determines that a warm-up of the display device 300 is not necessary (No in step S808). In this case, the warm-up determiner 212 determines that a warm-up is not necessary for both the display device 300 and the colorimeter 500 (step S810 END).

Second Stage

Next, with reference to FIGS. 9, 10, and 11, an example of the processing of the above-described second stage will be described (see FIG. 7). The processing of the second stage is processing in which the control device 200 displays, before starting the warm-up, the predetermined image P1 indicating the attachment position of the colorimeter 500 on the display device 300. FIG. 9 is diagram illustrating an example of a flow of the processing of the second stage according to an embodiment. FIG. 10 is a diagram illustrating an example of a first operation screen S1 according to an embodiment. FIG. 11 is a diagram illustrating an example of the predetermined image P1 according to an embodiment.

In the processing of the first stage, when the warn-up determiner 212 determines that a warm-up of the colorimeter 500 is to be performed (step S806 or step S807 of FIG. 8), the processing of the second stage is executed. Note that in the processing of the first stage, when the warm-up determiner 212 determines that only the display device 300 is to be warmed up (step S809 of FIG. 8), or a warm-up is not necessary (step S810 of FIG. 8), the controller 201 skips the processing of the second stage.

Figure 9:
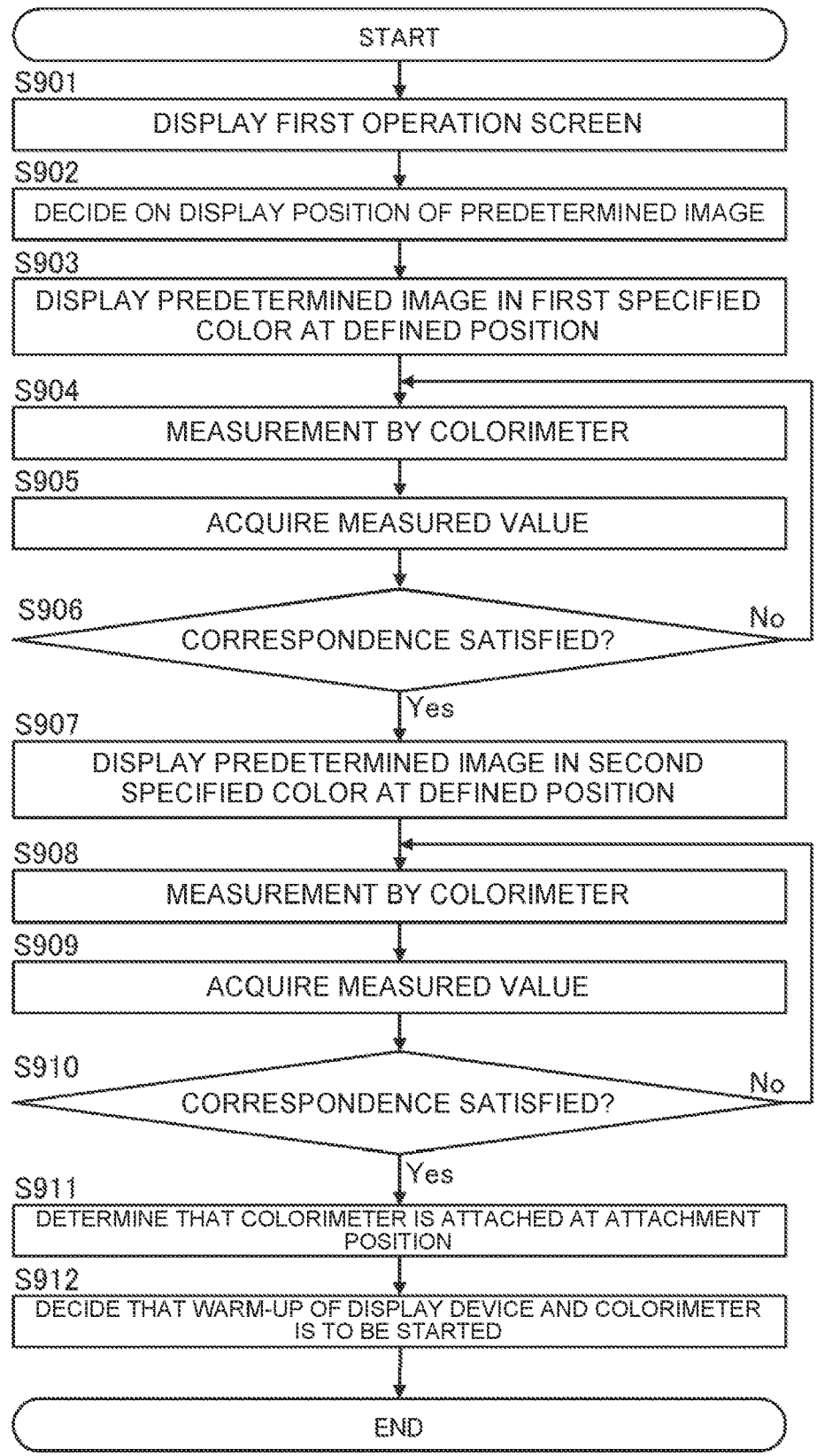
FIG. 9 is diagram illustrating an example of a flow of processing of a second stage according to an embodiment.
Figure 10:
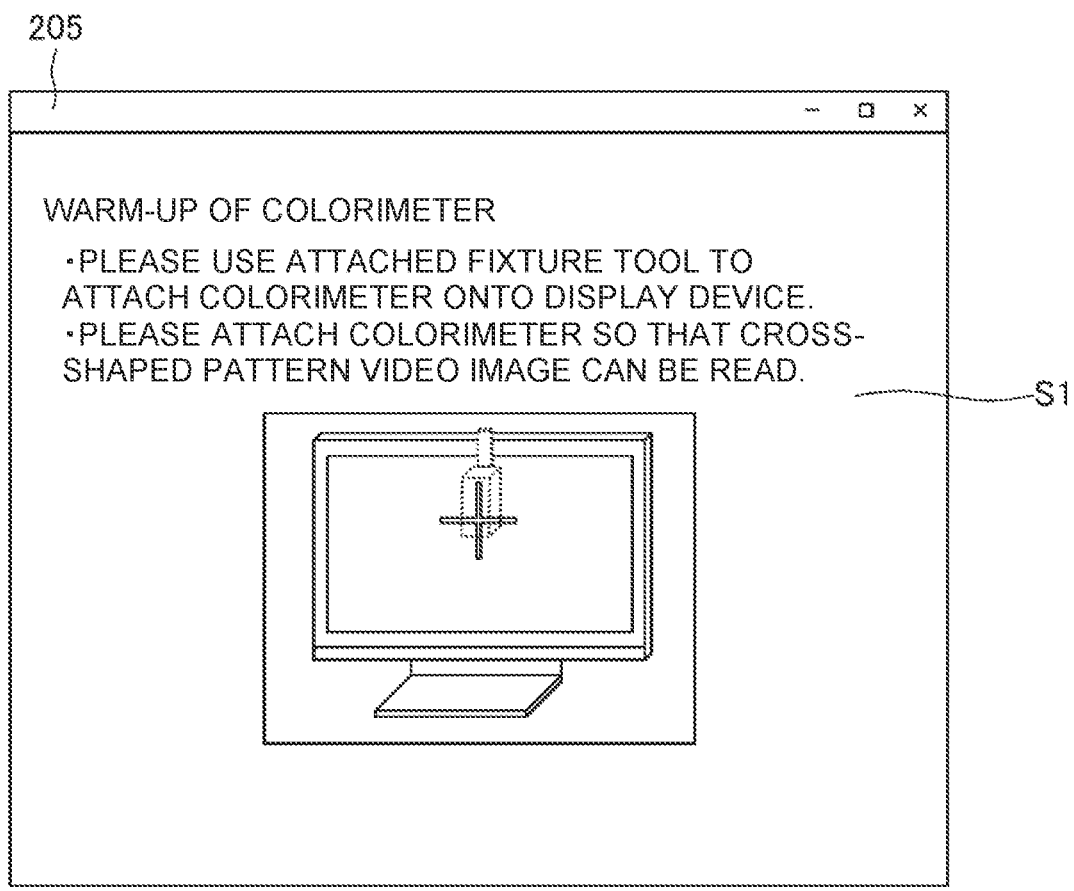
FIG. 10 is a diagram illustrating an example of a first operation screen according to an embodiment.

In FIG. 9, "START" corresponds to the point of time when the warm-up determiner 212 (the control circuit 211) has determined that a warm-up of the colorimeter 500 is to be performed. First, the controller 201 displays the first operation screen S1 on the display 205 (step S901). The first operation screen S1 is a screen displayed on the display 205 of the control device 200. As illustrated in FIG. 10, the first operation screen S1 is a screen whereby attachment of the colorimeter 500 is guided.

Next, the display controller 213 (the control circuit 211) decides on a display position of the predetermined image P1 (step S902). The predetermined image P1 is a video image indicating the attachment position of the colorimeter 500 onto the display device 300. In other words, the predetermined image P1 indicates the position where the colorimeter 500 should be hung using the attachment instrument 400. Their, the display controller 213 causes the predetermined image P1 in a first specified color to be displayed at a defined position on the display device 300 (step S903). The first specified color is determined in advance.

Figure 11:
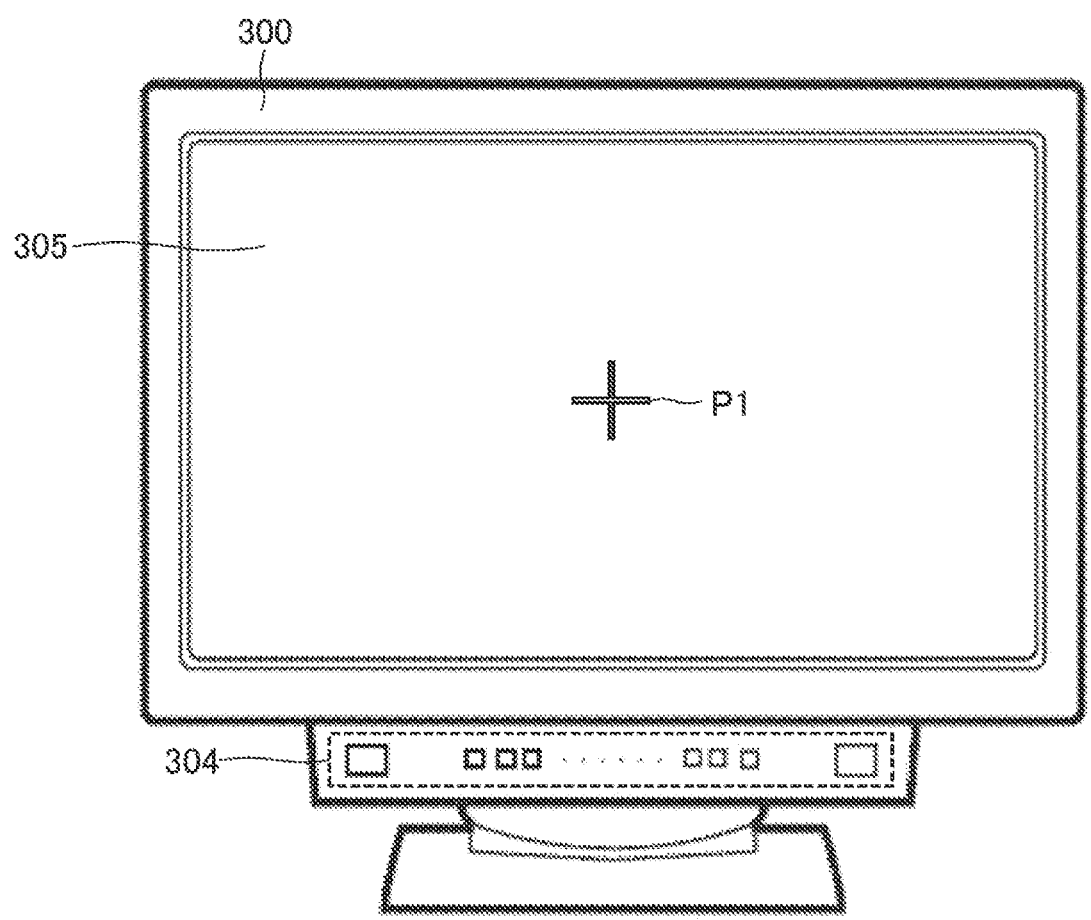
FIG. 11 is a diagram illustrating an example of a predetermined image according to an embodiment.

As illustrated in FIG. 11, the predetermined image P1 may be a cross-shaped graphic. Further, the predetermined image P1 may be rectangular. Furthermore, the predetermined image P1 may be a graphic having substantially the same size as the colorimeter 500, and indicating a contour of the colorimeter 500. Moreover, the shape of the predetermined image P1 is not limited to the above. It is sufficient if the predetermined image P1 is an image indicating the attachment position of the colorimeter 500.

The display controller 213 may define a position determined in advance as the display position of the predetermined image P1. For example, the display controller 213 may define a position where the center of the screen of the display device 300 and the center of the predetermined image P1 overlap one another as the display position of the predetermined image P1.

Also, the display controller 213 may define the display position of the predetermined image P1, on the basis of the history data LD1. For example, the display controller 213 may define, on the basis of the history data LD1, a position where the temperature is most raised during the warm-up as the display position of the predetermined image P1. For example, the display controller 213 may define a display position of the predetermined image P1 such that the center of the predetermined image P1 overlaps the installation position of the first temperature sensor 303 which has detected the highest temperature.

In this way, the recording processor 216 generates, on the basis of the first detected temperature detected by the plurality of first temperature sensors 303, the history data LD1 indicating a history of a temperature distribution of the display device 300 during the warm-up. The display controller 213 may cause the predetermined image P1 to be displayed at a position where the temperature is most raised during the warm-up in the history data LD1. By doing so, the colorimeter 500 can be attached at a position where the temperature is likely to be high during the warm-up. Thus, the colorimeter 500 can be warmed efficiently.

The user attaches the colorimeter 500 at a position where the colorimeter 500 reads the predetermined image P1. For example, the user attaches the colorimeter 500 at a position where the entire aperture covers the predetermined image P1. For example, when the predetermined image P1 is a cross-shape graphic, the user attaches the colorimeter 500 such that the aperture and an intersecting portion of the cross shape overlap one another.

When the predetermined image P1 is to be displayed, the display controller 213 may order the first communicator 206 to send, toward the display device 300, a predetermined image display command. The predetermined image display command includes a value indicating the coordinates for displaying the predetermined image P1, and a value indicating the display color. When the predetermined image display command is received, the pattern generator 312 generates a video signal for displaying the predetermined image P1. Specifically, the pattern generator 312 may generate, at the coordinates instructed by the command, a video signal which displays the predetermined image P1 in the instructed color.

Alternatively, the display controller 213 may generate a video signal, which displays the predetermined image P1, toward the display device 300. The display controller 213 generates a video signal whereby the predetermined image P1 in the specified color is displayed at a defined position. In this case, the display controller 213 orders the first communicator 206 to send, toward the display device 300, the generated video signal. When the video signal is received, the display controller 301 displays, on the display panel 305, the predetermined image P1 based on the received video signal.

After the display of the predetermined image P1 has been started, the warm-up controller 214 (the control circuit 211) starts to determine whether or not the colorimeter 500 is attached at the position indicated by the predetermined image P1.

Specifically, the warm-up controller 214 causes the colorimeter 500 to execute the measurement (step S904). Specifically, the warm-up controller 214 orders the second communicator 207 to send, toward the colorimeter 500, a color measurement command. On the basis of the color measurement command, the measurement processor 512 performs the color measurement. Further, the colorimetric controller 501 sends, toward the second communicator 207, the measured value obtained by the color measurement. As a result, the second communicator 207 acquires the measured value (step S905).

The warm-up controller 214 checks whether or not the acquired measured value corresponds to the specified color (first specified color) of the predetermined image P1. (step S906), For example, when red is specified as the first specified color, the warm-up controller 214 checks whether or not the measured color is red. Note that a range of the measured values that are considered to correspond to the specified color is determined in advance.

If correspondence is not satisfied (No in step S906), the warm-up controller 214 executes step S904 (i.e., returns to step S904). If correspondence is satisfied (Yes in step S906), the display controller 213 causes the predetermined image P1 in a second specified color to be displayed at a defined position on the display device 300 (step S907). The second specified color is a color different from the color of the immediately preceding specification (the first specified color).

In step S907, when the predetermined image P1 in the second specified color is to be displayed, as in step S903, the display controller 213 may order the first communicator 206 to send, toward the display device 300, a predetermined image display command. Alternatively, the display controller 213 may generate a video signal which displays the predetermined image P1 in the second specified color. Then, the display controller 213 may order the first communicator 206 to send, toward the display device 300, the generated video signal.

Further, the warm-up controller 214 causes the colorimeter 500 to execute the measurement (step S908). The warm-up controller 214 orders the second communicator 207 to send, toward the colorimeter 500, a color measurement command. On the basis of the color measurement command, the measurement processor 512 performs the color measurement. Further, the colorimetric controller 501 sends, toward the second communicator 207, the measured value obtained by the color measurement. As a result, the second communicator 207 acquires the measured value (step S909).

The warm-up controller 214 checks whether or not the acquired measured value corresponds to the specified color (second specified color) of the predetermined image P1 (step S910). For example, when the second specified color is blue, the warm-up controller 214 checks whether or not the measured color is blue. Note that a range of the measured values that are considered to correspond to the second specified color is determined in advance.

If correspondence is not satisfied (No in step S910), the warm-up controller 214 performs step S908 (i.e., returns to step S908). If correspondence is satisfied, the warm-up controller 214 determines that the colorimeter 500 is attached at the attachment position (step S911). Then, the warm-up controller 214 decides that a warm-up of the display device 300 and the colorimeter 500 is to be started (step S912).

In this way, the second communicator 207 of the control device 200 acquires, from the colorimeter 500, the measured value which is output from the colorimeter 500, and indicates color information of the measured color. When the color information indicated by the acquired measured value and color information of the predetermined image P1 being displayed by the display device 300 correspond to each other, the warm-up controller 214 determines that the colorimeter 500 is attached at the attachment position. It is thereby possible to automatically recognize that the colorimeter 500 has been attached. Moreover, it is possible to automatically recognize that the colorimeter 500 is attached at an appropriate position, Specifically; the display controller 213 causes the predetermined image P1 in different colors to be displayed on the display device 300 for a plurality of times in turn. The warm-up controller 214 determines that the colorimeter 500 is attached at the attachment position when the second communicator 207 has acquired the measured value of the corresponding color information, in the order of colors of the predetermined image P1 that has been displayed. By this feature, the attachment of the colorimeter 500 can be checked a plurality of times. Thus, it is possible to accurately detect that the colorimeter 500 has been attached at an appropriate position.

In the above, an example in which the controller 201 (the control circuit 211) automatically determines whether or not the colorimeter 500 is attached has been described. However, the input device 204 may receive an input of the completion of the attachment of the colorimeter 500. When the input device 204 has received a user operation indicating the completion of the attachment of the colorimeter 500, the warm-up controller 214 may decide that a warm-up of the display device 300 and the colorimeter 500 is to be started.

Third Stage

Figure 12:
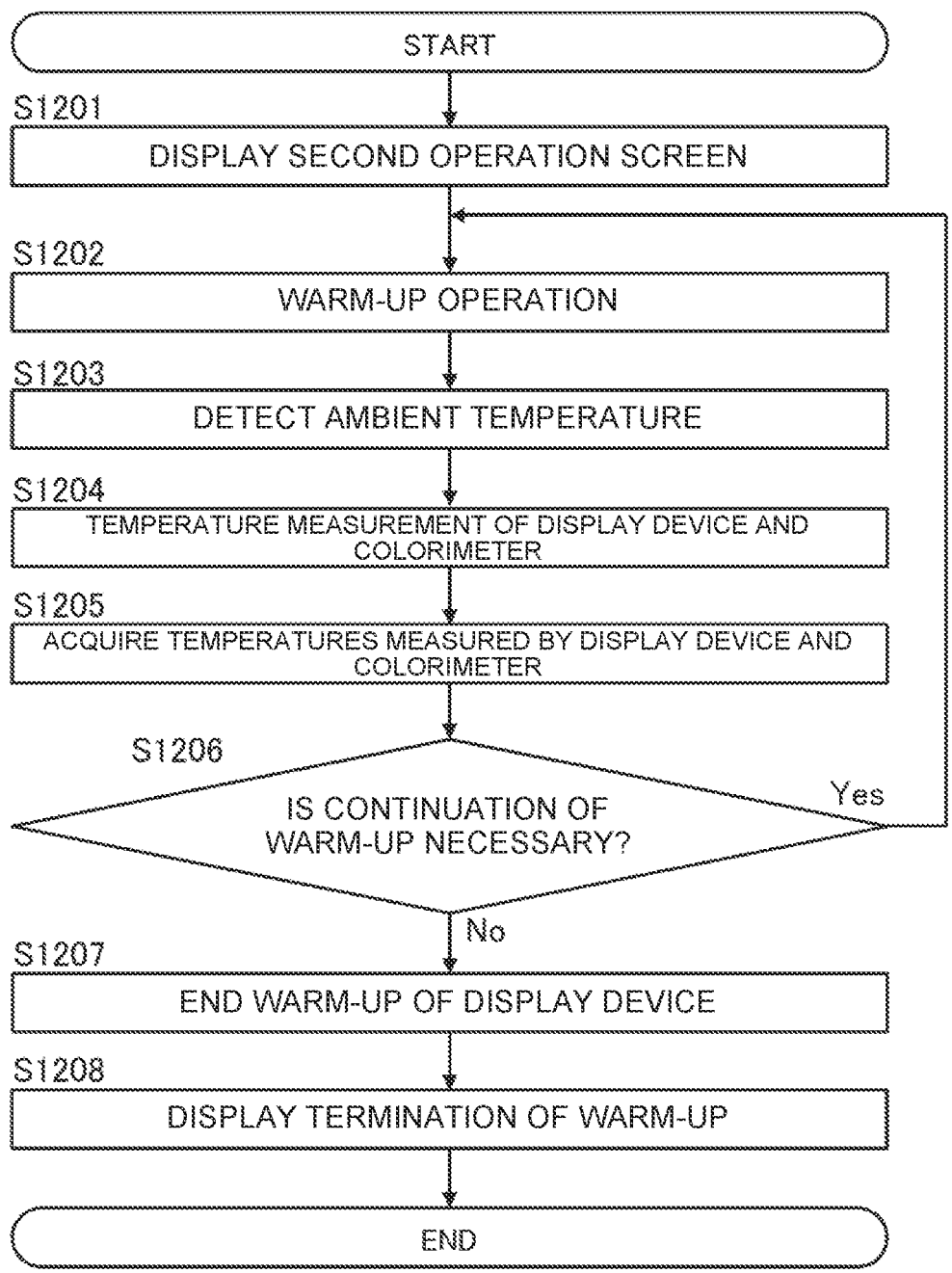
FIG. 12 is a diagram illustrating an example of a flow of warm-up processing for a display device and a colorimeter according to an embodiment.
Figure 13:
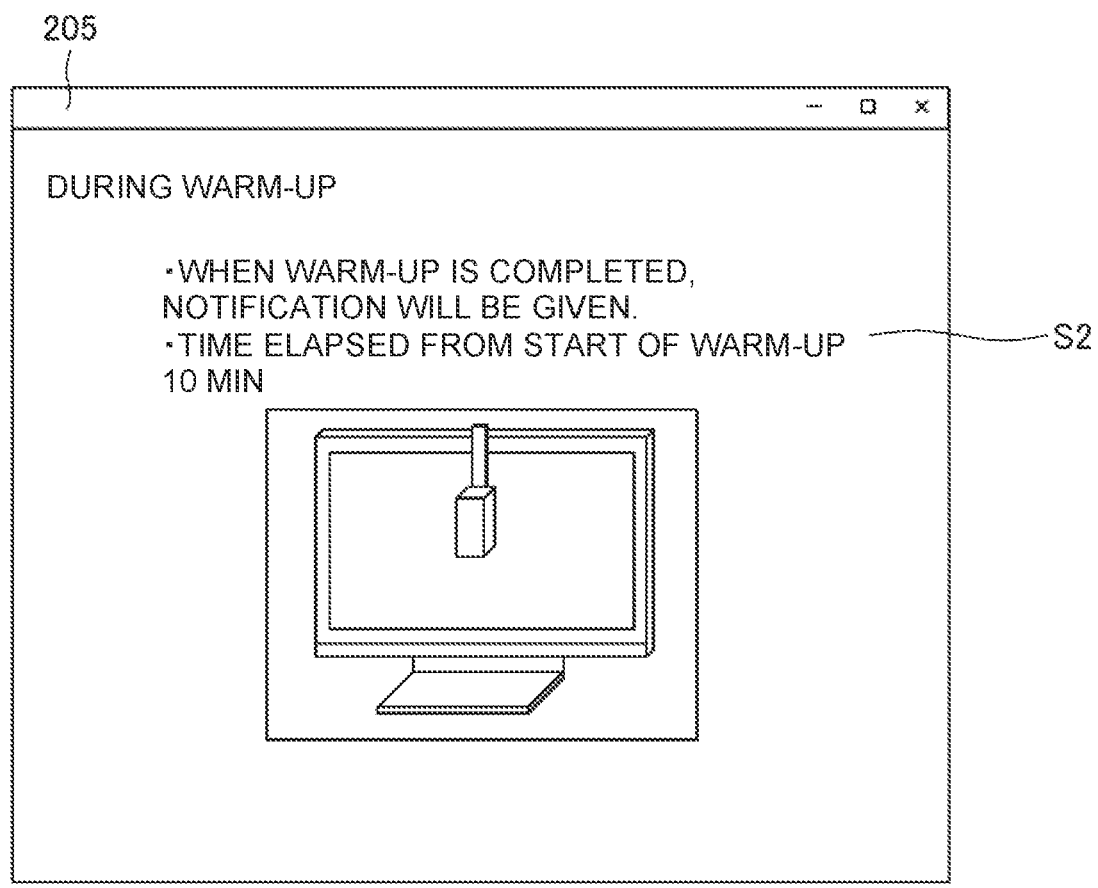
FIG. 13 is a diagram illustrating an example of a second operation screen according to an embodiment.
Figure 14:
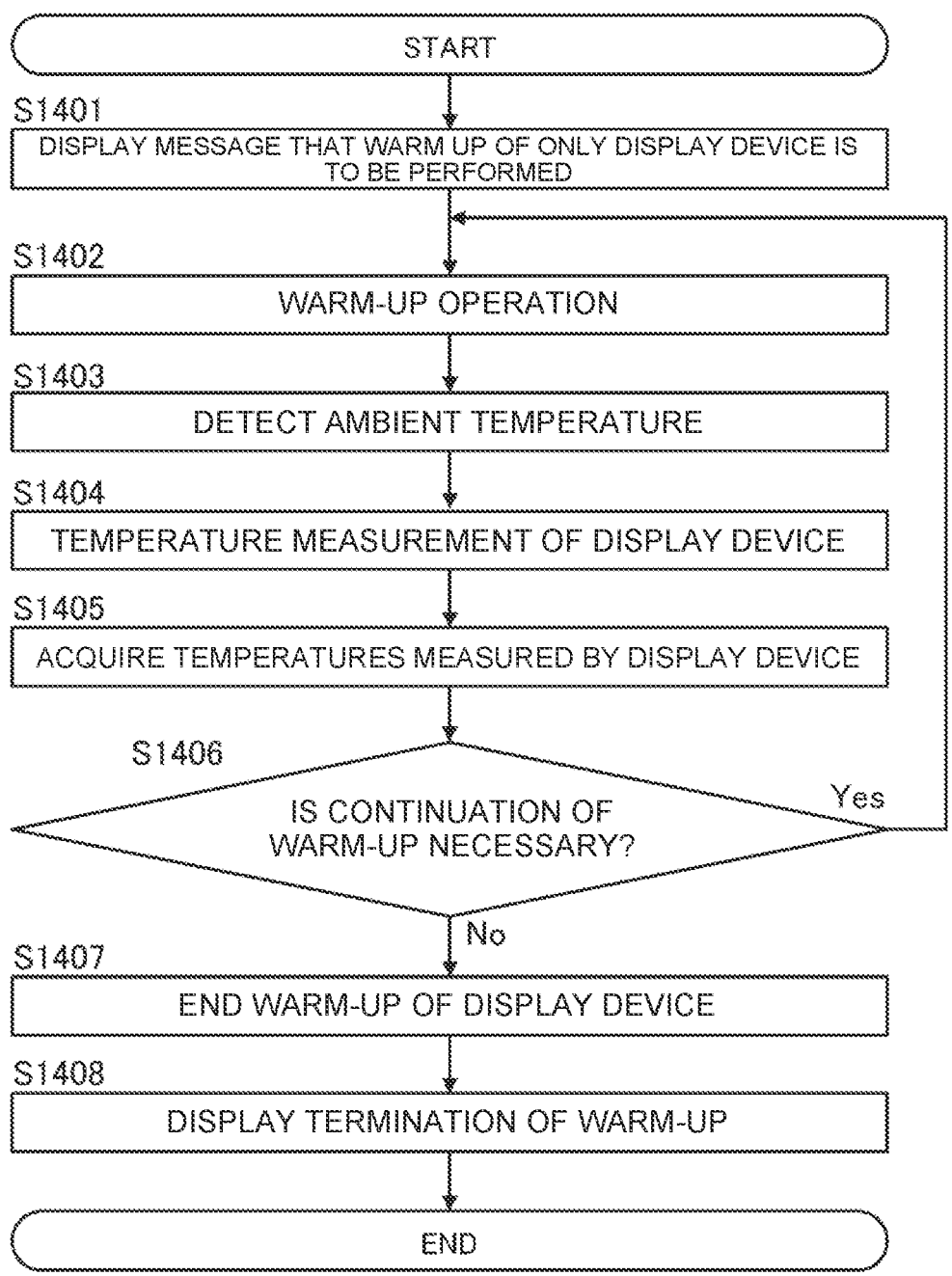
FIG. 14 is a diagram illustrating an example of a flow of warm-up processing for only the display device according to an embodiment.
Figure 15:
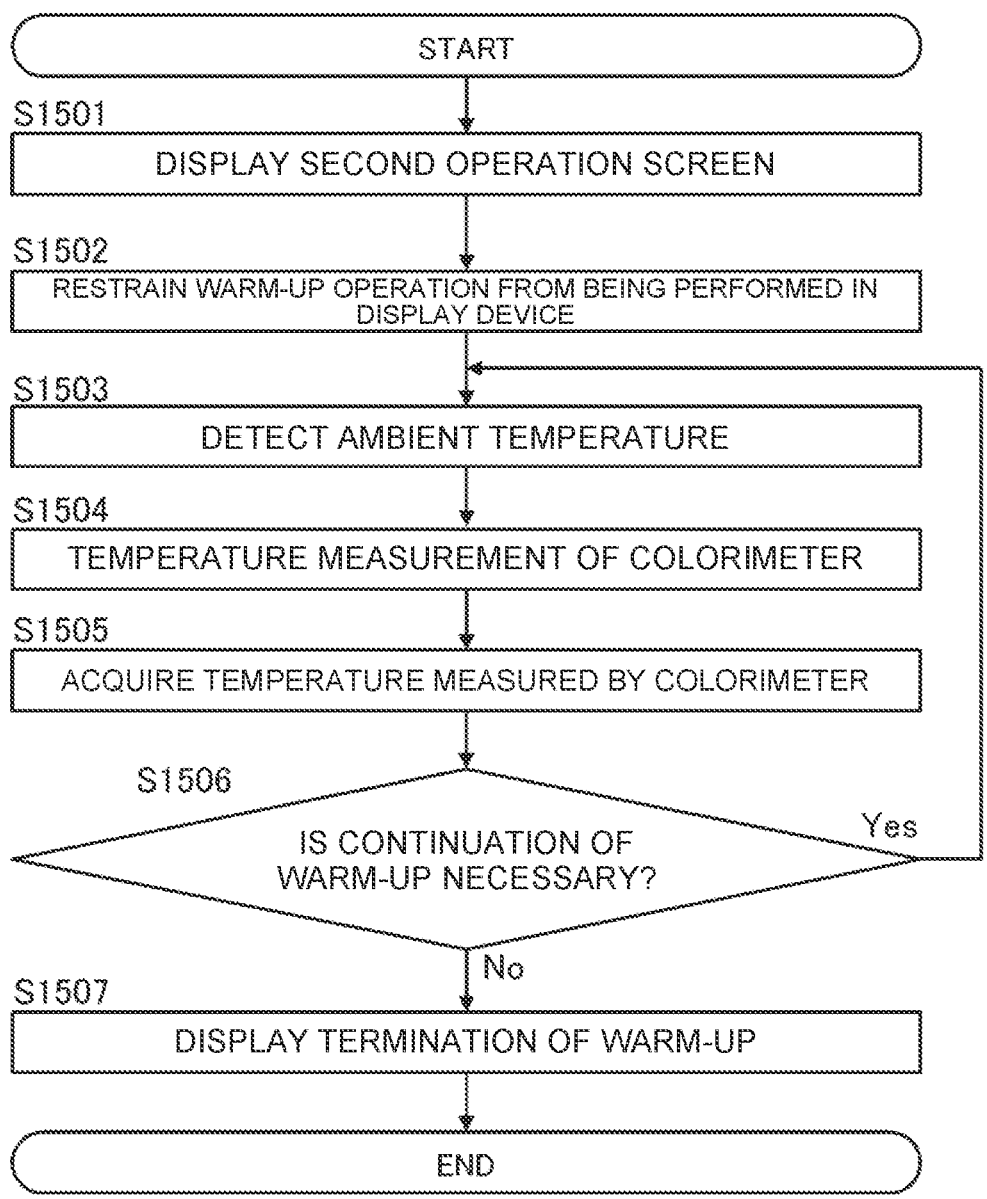
FIG. 15 is a diagram illustrating an example of a flow of warm-up processing for only the colorimeter according to an embodiment.

Next, with reference to FIGS. 12 to 15, an example of the processing of the above-described third stage will be described (see FIG. 7). The processing of the third stage is processing from a start of a warm-up of the display device 300 to an end of the warm-up. FIG. 12 is a diagram illustrating an example of a flow of warm-up processing for the display device 300 and the colorimeter 500 according to an embodiment. FIG. 13 is a diagram illustrating an example of a second operation screen S2 according to an embodiment. FIG. 14 is a diagram illustrating an example of a flow of warm-up processing for only the display device 300 according to an embodiment. FIG. 15 is a diagram illustrating an example of a flow of warm-up processing for only the colorimeter 500 according to an embodiment.

1. Warm-Up Processing for Display Device 300 and Colorimeter 500

First, referring to FIG. 12, an example of a flow of warm-up processing for the display device 300 and the colorimeter 500 according to an embodiment will be described. In FIG. 12, "START" corresponds to the point of time when the warm-up determiner 212 has determined, in the processing of the first stage, that a warm-up of the display device 300 and the colorimeter 500 is to be performed (step S806 of FIG. 8).

First, the controller 201 displays the second operation screen S2 on the display 205 (step S1201). The second operation screen S2 is a screen displayed on the display 205 of the control device 200. FIG. 13 shows an example of the second operation screen S2. The second operation screen S2 is a screen which provides information regarding the warm-up. For example, the controller 201 may display the time elapsed from a start of a warm-up on the second operation screen S2.

Further, the warm-up controller 214 causes the display device 300 to perform a warm-up operation (step S1202). The warm-up controller 214 orders the first communicator 206 to send, toward the display device 300, a warm-up start instruction command. When the warn-up start instruction command is received, the command processor 313 starts the operation of a warm-up of the display device 300.

In other words, when the warm-up determiner 212 determines that the warm-up of both the colorimeter 500 and the display device 300 is necessary, the warm-up controller 214 starts the warm-up of the display device 300 when the colorimeter 500 is determined as being attached at the attachment position. By this feature, it is possible to start the warm-up when the colorimeter 500 is certainly attached to the display device 300.

A warm-up is an operation of consuming power and raising the temperature inside the display device 300. For example, the command processor 313 executes the operation of a warm-up determined in advance. During the warm-up, the command processor 313 may display, on the display panel 305, a video image based on a video signal for reproduction when a warm-up is in progress that is stored in the display storage 302. Also, during the warm-up, the controller 201 may supply, to the display device 300 (the display communicator 307), a video signal of a video image to be reproduced when a warm-up is in progress. In this case, the display controller 301 displays a video image on the display panel 305, on the basis of the supplied video signal.

By the warm-up, the inside of the display device 300 is warmed. When the colorimeter 500 is attached, by the heat generated by the display device 300, the colorimeter 500 is also warmed.

Then, on the basis of an output of the temperature sensor 203, the warm-up controller 214 (the control circuit 211) detects the ambient temperature (room temperature) (step S1203). Also, the warm-up controller 214 orders the display device 300 and the colorimeter 500 to measure the temperature (step S1204). Specifically, the warm-up controller 214 orders the first communicator 206 to send, toward the display device 300, a temperature detection command for temperature detection using the first temperature sensor 303. Also, the warm-up controller 214 orders the second communicator 207 to send, toward the colorimeter 500, a temperature detection command for temperature detection using the second temperature sensor 503.

When the temperature detection command is received, the command processor 313 detects the temperature, on the basis of an output of each of the first temperature sensors 303. Further, the command processor 313 orders the display communicator 307 to send, toward the control device 200, the detected temperatures. Furthermore, when the temperature detection command is received, the colorimetric controller 501 activates the second temperature sensor 503 and detects the temperature. Further, the colorimetric controller 501 orders the colorimetric communicator 506 to send, toward the control device 200, the detected temperature.

As a result, the control device 200 acquires the temperatures measured by the display device 300 and the colorimeter 500 (step S1205). Specifically, the first communicator 206 communicates with the display device 300 including the first temperature sensors 303, and acquires the first detected temperature indicating the temperature of the display device 300 detected by the first temperature sensors 303. Further, the second communicator 207 communicates with the colorimeter 500 including the second temperature sensor 503, and acquires the second detected temperature indicating the temperature of the colorimeter 500 detected by the second temperature sensor 503. Note that the recording processor 216 may make the acquired first detected temperature and second detected temperature be stored, as the history data LD1, in the storage 202 in a non-volatile manner.

Then, the warm-up controller 214 determines whether or not warm-up continuation of the display device 300 and the colorimeter 500 is necessary (step S1206). If at least, one of the first condition, the second condition, the third condition, the fourth condition, and the fifth condition described above is satisfied, the warm-up controller 214 may determine that the warm-up continuation of the display device 300 and the colorimeter 500 is necessary. Meanwhile, if none of the first condition, the second condition, the third condition, the fourth condition, and the fifth condition described above is satisfied, the warm-up controller 214 may determine that the warm-up continuation of the colorimeter 500 is not necessary.

If at, least one of the first condition, the second condition, the third condition, the fourth condition, and the fifth condition described above is satisfied, but a sixth condition determined in advance is not satisfied, the warm-up controller 214 may determine that the warm-up continuation of the display device 300 and the colorimeter 500 is not necessary. Further, if the sixth condition is satisfied, the warm-up controller 214 may determine that the warm-up continuation of the display device 300 and the colorimeter 500 is necessary.

(Sixth Condition) Time elapsed from a start of the warm-up is less than a second predetermined time.

The second predetermined time is determined in advance. For example, the second predetermined time corresponds to a value that is greater than or equal to 20 minutes and less than 40 minutes. The second predetermined time is a time sufficient to warm up the display device 300. For example, the second predetermined time may be 30 minutes. The second predetermined time may be varied according to each model of the display device 300, By the sixth condition, it is possible to prevent the warm-up from being continued too long more than the second predetermined time.

If it is determined that the warm-up continuation is necessary (Yes in step S1206), the warm-up controller 214 executes step S1202 (i.e., returns to step S1202). Meanwhile, if it is determined that the warm-up continuation is not necessary (No in step S1206), the warm-up controller 214 ends the warm-up of the display device 300 (step S1207). For example, the warm-up controller 214 orders the first, communicator 206 to send, toward the display device 300, a warm-up end command. When the warm-up end command is received, for example, the command processor 313 ends the display of the video image displayed at the time of a warm-up.

In accordance with the end of the warm-up, the controller 201 causes the display 205 to display termination of the warm-up (step S1208 END). For example, instead of the second operation screen S2, the controller 201 may display a message such as "Warm-up is completed" on the display 205, Alternatively, the controller 201 may cause the display device 300 (the display panel 305) to display termination of the warm-up.

2. Warm-Up Processing for Only Display Device 300

First, referring to FIG. 14, an example of a flow of warm-up processing for the display device 300 according to an embodiment will be described. In FIG. 14, "START" corresponds to the point of time when the warm-up determiner 212 has determined, in the processing of the first stage, that a warm-up of the colorimeter 500 is not necessary, and a warm-up of the display device 300 is necessary (step S809 of FIG. 8).

First, the controller 201 displays a message that a warm up of only the display device 300 is to be performed on the display 205 (step S1401). Further, the warm-up controller 214 causes the display device 300 to perform a warm-up operation (step S1402). The warm-up controller 214 orders the first communicator 206 to send, toward the display device 300, a warm-up start instruction command. When the warm-up start instruction command is received, the command processor 313 starts the operation of a warm-up of the display device 300. The substance of the operation of the warm-up may be the same as that described referring to FIG. 12. By the warm-up, the inside of the display device 300 is warmed.

When the warm-up determiner 212 determines that the warm-up of only the display device 300 is necessary, the warm-up controller 214 starts the warm-up of the display device 300. At this time, unlike the case where the colorimeter 500 is also to be warmed up, the display controller 213 restrains the predetermined image P1 from being displayed on the display device 300. By this feature, it is possible to prevent the predetermined image P1 from being displayed when the warm-up of the colorimeter 500 is not necessary. That is, needless display and processing can be omitted. The display device 300 can be speedily warmed.

Then, the warm-up controller 214 (the control circuit 211) detects, on the basis of an output of the temperature sensor 203, the ambient temperature (room temperature) (step S1403). Also, the warm-up controller 214 orders the display device 300 to measure the temperature (step S1404). Specifically, the warm-up controller 214 orders the first communicator 206 to send, toward the display device 300, a temperature detection command for temperature detection using the first temperature sensor 303. When the temperature detection command is received, the command processor 313 detects the temperature, on the basis of an output of each of the first temperature sensors 303. Further, the command processor 313 orders the display communicator 307 to send, toward the control device 200, the detected temperatures.

As a result, the control device 200 acquires the temperatures measured by the display device 300 (step S1405). Note that, the recording processor 216 may make the acquired first detected temperature be stored, as the history data. LD1, in the storage 202 in a non-volatile manner Then, the warm-up controller 214 determines whether or not warm-up continuation of the display device 300 is necessary (step S1406), If at least one of the fourth condition and the fifth condition described above is satisfied, the warm-up controller 214 may determine that the warm-up continuation of the display device 300 is necessary. Meanwhile, if neither the fourth condition nor the fifth condition described above is satisfied, the warm-up controller 214 may determine that the warm-up continuation of the display device 300 is not necessary. If at least one of the fourth condition and the fifth condition described above is satisfied, but the sixth condition described above is not satisfied, the warm-up controller 214 may determine that the warm-up continuation of the display device 300 is not necessary.

If it is determined that the warm-up continuation is necessary (Yes in step S1406), the warm-up controller 214 executes step S1402 (i.e., returns to step S1402). Meanwhile, if it is determined that the warm-up continuation is not necessary (No in step S1406), the warm-up controller 214 ends the warm-up of the display device 300 (step S140). For example, the warm-up controller 214 orders the first communicator 206 to send, toward the display device 300, a warm-up end command. When the warm-up end command is received, for example, the command processor 313 ends the display of the video image displayed at the time of a warm-up.

In accordance with the end of the warm-up, the controller 201 causes the display 205 to display termination of the warm-up (step S1408→END). For example, the controller 201 may display a message such as "Warm-up is completed" on the display 205. Alternatively, the controller 201 may cause the display device 300 (the display panel 305) to display termination of the warm-up of the display device 300.

3. Warm-Up Processing for Only Colorimeter 500

First, referring to FIG. 15, an example of a flow of warm-up processing for only the colorimeter 500 according to an embodiment will be described. In FIG. 15, "START" corresponds to the point of time when the warm-up determiner 212 has determined, in the processing of the first stage, that a warm-up of the colorimeter 500 is necessary; and a warm-up of the display device 300 is not necessary (step S807 of FIG. 8).

First, the controller 201 displays the second operation screen S2 on the display 205 (step S1501, see FIG. 13). Here, the warm-up controller 214 restrains a warm-up operation from being performed in the display device 300 (step S1502). In other words, when only the colorimeter 500 is to be warmed up, the warm-up controller 214 does not send a warm-up start instruction command toward the display device 300.

When the warm-up determiner 212 determines that a warm-up of only the colorimeter 500 is necessary, the display controller 213 displays the predetermined image P1 on the display device 300. However, even when it is determined that the colorimeter 500 is attached at the attachment position, the warm-up controller 214 restrains the warm-up of the display device 300 from being started.

If the display device 300 is sufficiently warm, the operation of a warm-up in the display device 300 can be omitted. By the heat accumulated in the display device 300, the colorimeter 500 can be warmed.

If the warm-up determiner 212 determines that a warm-up of the colorimeter 500 is necessary, and a warm-up of the display device 300 is not necessary, the display device 300 is sufficiently warm. That is, the display device 300 is warm enough to warm the colorimeter 500. The temperature of the colorimeter 500 that is in contact with the display device 300 gradually increases. By the heat accumulated in the display device 300, the colorimeter 500 is also warmed.

Then, the warm-up controller 214 (the control circuit 211) detects, on the basis of an output of the temperature sensor 203, the ambient temperature (room temperature) (step S1503). Also, the warm-up controller 214 orders the colorimeter 500 to measure the temperature (step S1504), Specifically, the warm-up controller 214 orders the second communicator 207 to send, toward the colorimeter 500, a temperature detection coma and for temperature detection using the second temperature sensor 503. When the temperature detection command is received, the colorimetric controller 501 activates the second temperature sensor 503 and detects the temperature. Further, the colorimetric controller 501 orders the colorimetric communicator 506 to send, toward the control device 200, the detected temperature.

As a result, the control device 200 acquires the temperature measured by the colorimeter 500 (step S1505). Specifically, the second communicator 207 communicates with the colorimeter 500 including the second temperature sensor 503, and acquires the second detected temperature indicating the temperature of the colorimeter 500 detected by the second temperature sensor 503. Note that the recording processor 216 may make the acquired second detected temperature be stored, as the history data LD1, in the storage 202 in a non-volatile manner.

Then, the warm-up controller 214 determines whether or not warm-up continuation of the colorimeter 500 is necessary (step S1506). If at least one of the first condition, the second condition, and the third condition described above is satisfied, the warm-up controller 214 may determine that the warm-up continuation of the colorimeter 500 is necessary. Meanwhile, if none of the first condition, the second condition, and the third condition described above is satisfied, the warm-up controller 214 may determine that the warm-up continuation of the colorimeter 500 is not necessary. If at least one of the first condition, the second condition, and the third condition described above is satisfied, but the sixth condition described above is not satisfied, the warm-up controller 214 may determine that the warm-up continuation of the colorimeter 500 is not necessary.

If it is determined that the warm-up continuation is necessary (Yes in step S1506), the warm-up controller 214 executes step S1503 (i.e., returns to step S1503). Meanwhile, if the warm-up controller 214 determines that the warm-up continuation is not necessary (No in step S1506), the controller 201 causes the display 205 to display termination of the warm-up of the colorimeter 500 (step S1507→END). For example, the controller 201 may display a message such as "Warm-up is completed" on the display 205. Alternatively, the controller 201 may cause the display device 300 (the display panel 305) to display termination of the warm-up.

Fourth Stage

Next, with reference to FIGS. 16 to 18, an example of the processing of the fourth stage described above (see FIG. 7) will be described. The fourth stage is the stage in which the control device 200 executes, after the warm-up has been ended, the processing of color calibration of the display device 300. FIG. 16 is diagram illustrating an example of a flow of the processing of the fourth stage according to an embodiment. FIG. 17 is a diagram illustrating an example of a third operation screen S3 according to an embodiment. FIG. 18 is a diagram illustrating an example of a fourth operation screen S4 according to an embodiment.

Figure 8:
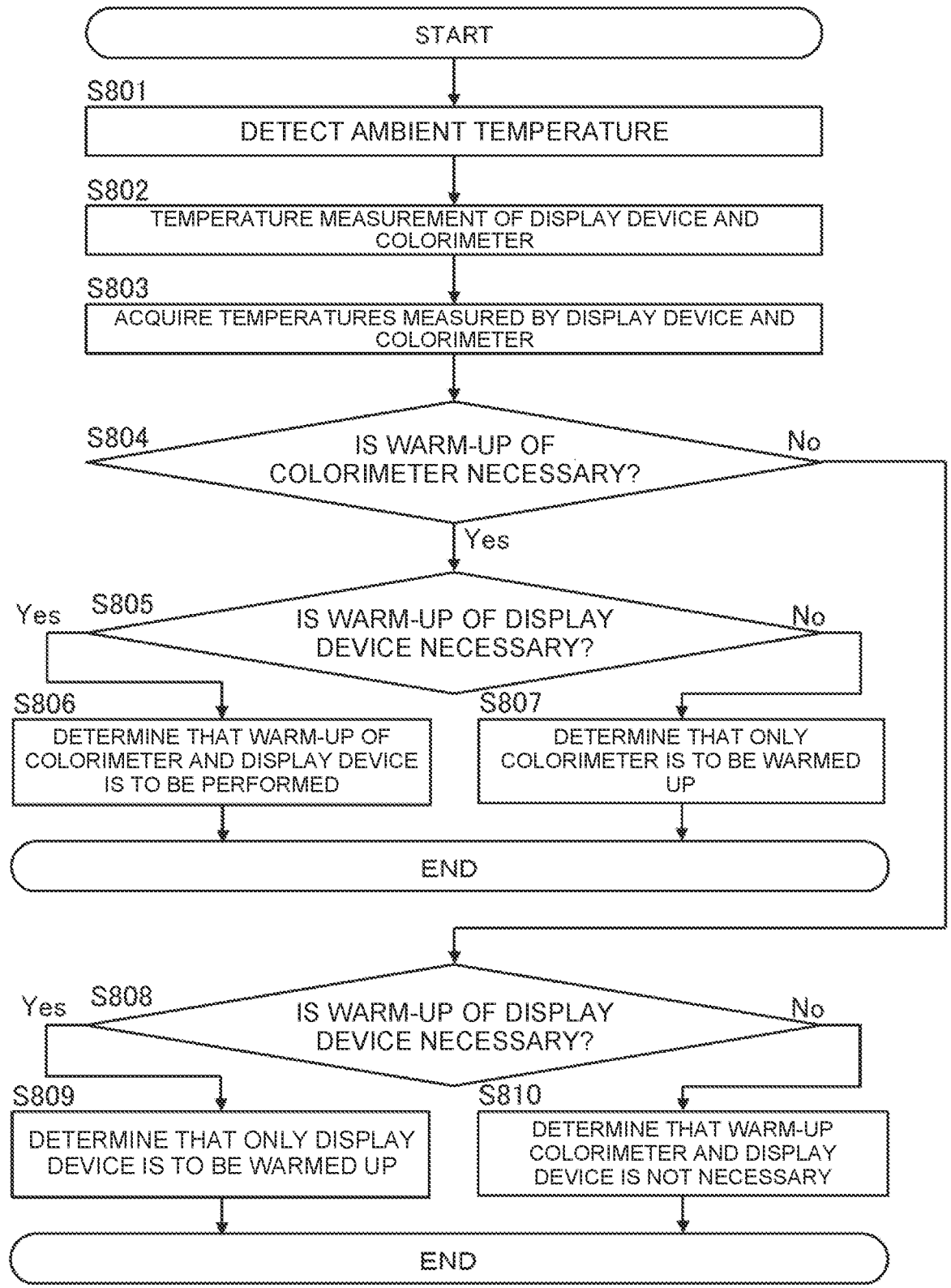
FIG. 8 is diagram illustrating an example of a flow of processing of a first stage according to an embodiment.
Figure 16:
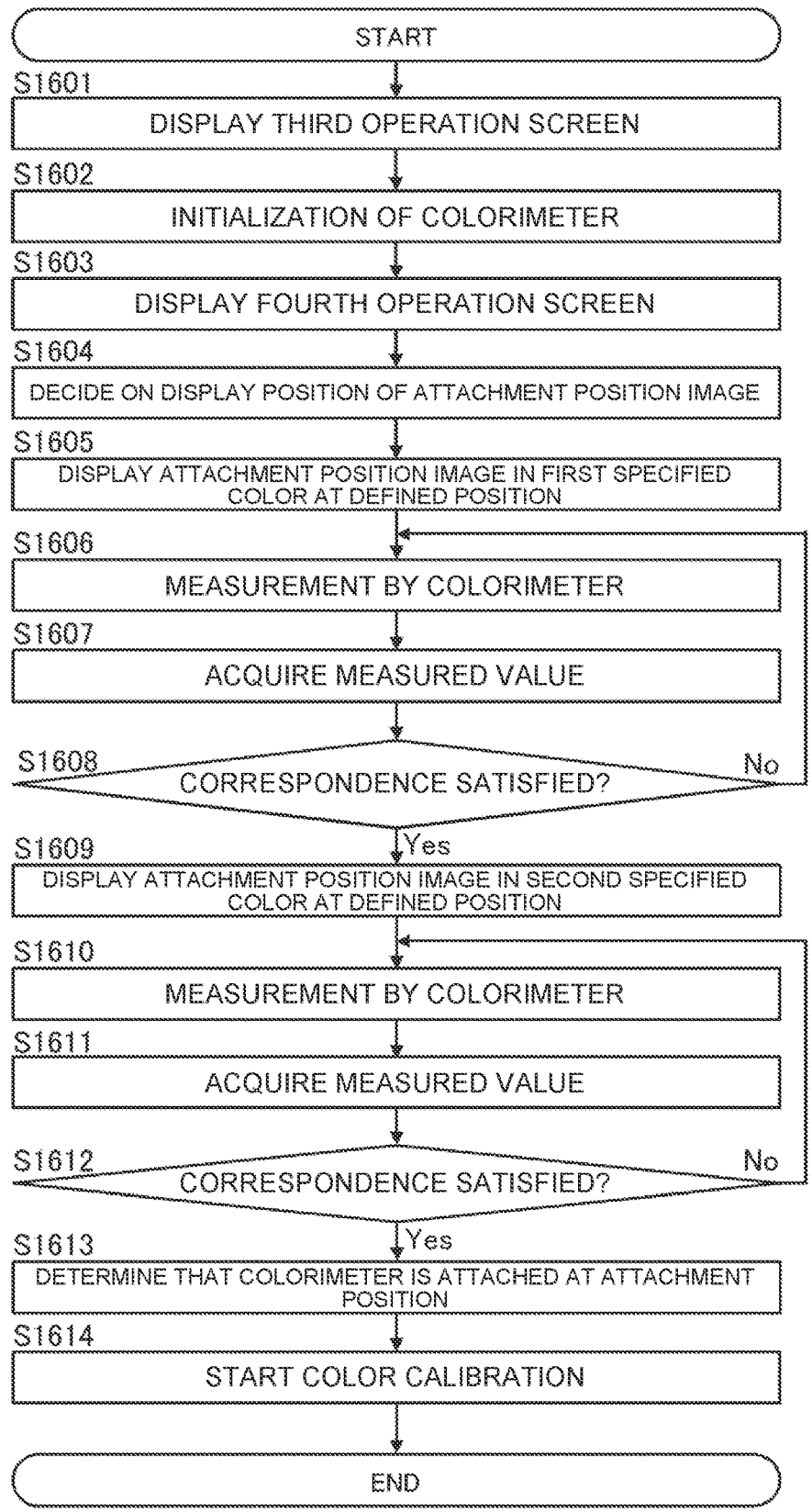
FIG. 16 is diagram illustrating an example of a flow of processing of a fourth stage according to an embodiment.

In FIG. 16, "START" corresponds to the point of time when the warm-up controller 214 has ended the warm-up, in the processing of the third stage, or the point of time when the warm-up determiner 212 has determined, in the processing of the first stage, not to perform the warm-up (step S810 of FIG. 8).

First, the controller 201 displays the third operation screen S3 on the display 205 (step S1601). FIG. 17 is a diagram illustrating an example of the third operation screen S3. The third operation screen S3 is a screen whereby initialization (calibration) of the colorimeter 500 is guided. The initialization of the colorimeter 500 is performed in a state in which the colorimeter 500 is warmed.

The substance of the initialization processing (calibration processing) of the colorimeter 500 is determined according to the model of the colorimeter 500. In performing the initialization processing, the colorimeter 500 reads the initialization reference section 507 (e.g., a white reference plate) prepared in advance. The third operation screen S3 of FIG. 17 shows an example of a screen for allowing the user to execute the initialization processing of the colorimeter 500. For example, the user operates the colorimeter 500, and sets the colorimeter 500 to such a state that the measurer 505 reads the initialization reference section 507. After the setting is complete, the user operates an initialization start button B1. When the initialization start button B1 is operated, the calibration executor 217 sends an initialization start command to the colorimeter 500.

The colorimetric storage 502 stores initialization software in a non-volatile manner. When the initialization start command is received, the colorimetric controller 501 performs initialization of the colorimeter 500 (step S1602). For example, the colorimetric controller 501 (the measurement processor 512) executes programs and commands included in the initialization software. By doing so, the colorimetric controller 501 performs calibration of the colorimeter 500. For example, the colorimetric controller 501 may obtain a correction value to be used for making a measured value, which is obtained when the lamp 504 is lit, and the initialization reference section 507 is read, a reference value determined in advance. In this case, the colorimetric controller 501 causes a value obtained by adjusting the measured value by the correction value to be output as the measured value.

When a notification of the initialization completion is received from the colorimeter 500, the controller 201 displays the fourth operation screen S4 on the display 205 (step S1603). FIG. 18 shows an exam pie of the fourth operation screen S4. The fourth operation screen S4 is a screen whereby the attachment position of the colorimeter 500 at the time of color calibration is guided.

The calibration executor 217 (the control circuit 211) decides on a display position of an attachment position image (step S1604). The attachment position image is a video image indicating the attachment position of the colorimeter 500 onto the display device 300 during color calibration. Further, the calibration executor 217 causes the attachment position image in the first specified color to be displayed at a defined position on the display device 300 (step S1605).

The user attaches the colorimeter 500 at a position where the colorimeter 500 reads the attachment position image. For example, the user attaches the colorimeter 500 at a position where the entire aperture covers the attachment position image. Further, the shape and the size of the attachment position image may be the same as those of the predetermined image P1 that is displayed before the warm-up. The attachment position image may be cross-shaped or may be rectangular.

The calibration executor 217 may define a position determined in advance as the display position of the attachment position image for color calibration. For example, the calibration executor 217 may define a position where the center of the screen of the display device 300 and the center of the attachment position image overlap one another as the display position of the attachment position image.

Also, the calibration executor 217 may define the display position of the attachment position image, on the basis of the history data LD1. For example, the calibration executor 217 may define a position where a highest temperature is not recorded during the warm-up and color calibration, in the history data LD1, as the display position of the attachment position image for color calibration. Specifically, the calibration executor 217 may define the display position of the attachment position image such that the aperture of the colorimeter 500 overlaps the installation position of the first temperature sensor 303 which has not recorded the highest temperature.

In this way, on the basis of the first detected temperature detected by the plurality of first temperature sensors 303, the recording processor 216 includes a history of a temperature distribution of the display device 300 during the color calibration, in the history data LD1. The calibration executor 217 causes the attachment position image, which indicates the attachment position of the colorimeter 500 during color calibration, to be displayed at a position where a highest temperature is not recorded during the warm-up and the color calibration, in the history data LD1, or a position determined in advance. It is thereby possible to indicate, to the user, the position where the colorimeter 500 should be attached during the color calibration. Since the colorimeter 500 can be attached at a position which does not cause a problem in the measurement, the occurrence of a color calibration failure can be suppressed. Also, since it is possible to recommend attachment of the colorimeter 500 at a position where a highest temperature is not recorded, the colorimeter 500 can be attached at a position where the temperature of the colorimeter 500 will not be changed greatly. Since a change in temperature of the colorimeter 500 can be suppressed, the color and luminance can be accurately measured. Also, it is possible to prevent the occurrence of a circumstance of having to initialize the colorimeter 500 again, and redo the color calibration.

When the attachment position image for color calibration is to be displayed, the calibration executor 217 may order the first communicator 206 to send, toward the display device 300, an attachment position image display command. The attachment position image display command includes a valise indicating the coordinates for displaying the attachment position image, and a value indicating the display color. When the attachment position image display command is received, the pattern generator 312 generates a video signal for displaying the attachment position image. The display controller 301 may generate, at the coordinates instructed by the command, a video signal which displays the attachment position image in the instructed color (the first specified color).

Alternatively, the calibration executor 217 may generate a video signal which displays the attachment position image. The calibration executor 217 generates a video signal whereby an attachment position image in the first specified color is displayed at a defined position. In this case, the calibration executor 217 orders the first communicator 206 to send, toward the display device 300, the generated video signal. When the video signal is received, the display controller 301 displays, on the display panel 305, the attachment position image based on the received video signal.

After the display of the attachment position image has been started, the calibration executor 217 (the control circuit 211) starts to determine whether or not the colorimeter 500 is attached at a position indicated by the attachment position image.

Specifically; the calibration executor 217 causes the colorimeter 500 to execute the measurement (step S1606). Specifically, the calibration executor 217 orders the second communicator 207 to send, toward the colorimeter 500, a color measurement command. On the basis of the color measurement command, the measurement processor 512 performs the color measurement. Further, the colorimetric controller 501 sends, toward the second communicator 207, the measured value obtained by the color measurement. As a result, the second communicator 207 acquires the measured value (step S1607).

The calibration executor 217 checks whether or not the acquired measured value corresponds to the specified color (first specified color) of the attachment position image (step S1608). For example, when the first specified color is red, the calibration executor 217 checks whether or not the measured color is red.

If the colors do not correspond (No in step S1608), the calibration executor 217 executes step S1606 (i.e., returns to step S1606). If the colors correspond, the display controller 213 causes the attachment position image in the second specified color to be displayed at a defined position on the display device 300 (step S1609). The second specified color is a color different from the color of the immediately preceding specification (the first specified color).

In step S1609, when the attachment position image in the second specified color is to be displayed, as in step S903, the calibration executor 217 may order the first communicator 206 to send, toward the display device 300, an attachment position image display command. Alternatively, the calibration executor 217 may generate a video signal which displays the attachment position image in the second specified color. Further, the calibration executor 217 may order the first communicator 206 to send, toward the display device 300, the generated video signal.

Then, the calibration executor 217 causes the colorimeter 500 to execute the measurement (step S1610). The calibration executor 217 orders the second communicator 207 to send, toward the colorimeter 500, a color measurement command. On the basis of the color measurement command, the measurement processor 512 performs the color measurement. Further, the colorimetric controller 501 sends, toward the second communicator 207, the measured value obtained by the color measurement. As a result, the second communicator 207 acquires the measured value (step S1611).

The calibration executor 217 checks whether or not the acquired measured value corresponds to the specified color (second specified color) of the attachment position image (step S1612). For example, when the second specified color is green, the calibration executor 217 checks whether or not the measured color is green.

If correspondence is not satisfied (No in step S1612), the calibration executor 217 executes step S1610 (i.e., returns to step S1610). If correspondence is satisfied (Yes in step S1612), the calibration executor 217 determines that the colorimeter 500 is attached at the attachment position (step S1613). Then, the calibration executor 217 starts the color calibration of the display device 300 (step S1614→END).

As described above, the warm-up controller 214 determines, after starting the warm-up of the display device 300, whether continuation of the warm-up of the display device 300 is necessary on the basis of the first detected temperature, and also determines whether continuation of the warm-up of the colorimeter 500 is necessary on the basis of the second detected temperature. Further, when it is determined that the continuation of the warm-up of the display device 300 and the colorimeter 500 is not necessary, the warm-up controller 214 ends the warm-up of the colorimeter 500 and the display device 300. The calibration executor 217 starts, after the warm-up has been ended, the color calibration of the display device 300 after the colorimeter 500 is initialized. By doing so, the colorimeter 500 can be initialized after the colorimeter 500 has been sufficiently warmed. Since the colorimeter 500 is sufficiently warmed, a rise in temperature of the colorimeter 500 during color calibration can be suppressed. The color and luminance can be accurately measured. Also, during the color calibration, it is possible to suppress such a change in temperature of the colorimeter 500 as the colorimeter 500 needs to be reinitialized. The occurrence of a circumstance of having to redo the color calibration can be prevented.

In the above, an example in which the controller 201 (the control circuit 211) automatically determines whether or not the colorimeter 500 is attached has been described. However, the input device 204 may receive an input of the completion of the attachment of the colorimeter 500. When the input device 204 has received a user operation indicating the completion of the attachment of the colorimeter 500, the calibration executor 217 may decide that color calibration of the display device 300 and the colorimeter 500 is to be started.

In the processing of the color calibration, the calibration executor 217 performs luminance adjustment, color gamut adjustment, color temperature adjustment, and gamma adjustment. In performing the luminance adjustment, the calibration executor 217 displays a luminance adjustment image on the display device 300. The colorimeter 500 measures the luminance of the luminance adjustment image. The calibration executor 217 may adjust the amount of light of the backlight so that the luminance realizes a target value. Further, in performing the color gamut adjustment, the calibration executor 217 displays, for example, each of a red patch image, a green patch image, and a blue patch image on the display device 300. The colorimeter 500 reads the patch image of each color. A correction value of transmittance control of the liquid crystal panel is set such that the luminance of the patch image of each color realizes a target value. Furthermore, in performing the color temperature adjustment, the calibration executor 217 displays a white image on the display device 300. The colorimeter 500 reads the white image. The calibration executor 217 sets a correction value to control the transmittance of each color such that the color temperature of the white image realizes a target value. In performing the gamma adjustment, the calibration executor 217 displays a plurality of images whose luminance is different on the display device 300. The colorimeter 500 reads each of the images. The calibration executor 217 sets a correction value corresponding to a luminance level such that a change in the display luminance depicts a target gamma characteristic (gamma curve).

Note that, the items to be adjusted by the color calibration are not limited to the above. The calibration executor 217 may also adjust the other items.

The present disclosure also discloses the display device control system 100. Specifically, the display device control system 100 is provided with the display device 300 and the control device 200. When color calibration of the display device 300 is to be performed, the warm-up determiner 212 determines, on the basis of the predetermined condition, whether or not a warm-up of the colorimeter 500 is necessary. When the warm-up determiner 212 determines that the warm-up of the colorimeter 500 is necessary, the display controller 213 causes the predetermined image P1 indicating the attachment position of the colorimeter 500 onto the display device 300 to be displayed on the display device 300. When it is determined that the colorimeter 500 is attached at the attachment position, the warm-up controller 214 starts the warm-up of the colorimeter 500 by using the display device 300.

Further, the present disclosure also discloses a control method of the control device 200. Specifically, the control method of the control device 200 includes: determining, when color calibration of the display device 300 is to be performed, whether or not a warm-up of the colorimeter 500 is necessary on the basis of a predetermined condition; causing, when the warm-up of the colorimeter 500 is determined as being necessary, the predetermined image P1, which indicates an attachment position of the colorimeter 500 in the display device 300, to be displayed on the display device 300; determining whether or not the colorimeter 500 is attached at the attachment position; and starting, when the colorimeter 500 is determined as being attached at the attachment position, a warm-up of the display device 300.

According to the display device control system 100, and the control method of the control device 200, the colorimeter 500 can be warmed by using the display device 300. The colorimeter 500 can be sufficiently warmed before starting color calibration. When color calibration is started after the warm-up has been ended, even if heat is received from the display device 300 during the color calibration, it is possible to suppress a great change in temperature of the colorimeter 500. Consequently, during the color calibration, the color of a video image displayed by the display device 300 can be accurately measured. Also, it is possible to suppress the occurrence of a circumstance in which the colorimeter 500 must be reinitialized due to a great change in temperature of the colorimeter 500. The occurrence of a circumstance of having to redo the color calibration can be prevented.

While there have been described what, are at present considered to be certain embodiments of the invention, it will be understood that various modifications may be made thereto, and it is intended that the appended claim cover all such modifications as fall within the true spirit and scope of the invention.

What is claimed is:

1. A control device comprising:
   a warm-up determiner which determines, when color calibration of a display device is to be performed, whether a warm-up of a colorimeter is necessary, based on a predetermined condition, the colorimeter being outside the display device and attachable to a display panel of the display device;
   a display controller which causes, when the warm-up determiner determines that the warm-up of the colorimeter is necessary, a predetermined image to be displayed on the display panel, the predetermined image indicating an attachment position on the display panel at which the colorimeter is to be attached by a user; and
   a warm-up controller which starts, when the colorimeter is determined as being attached at the attachment position, the warm-up of the colorimeter, that is directly in contact with the display panel at the attachment position, by using the display device.

2. The control device according to claim 1, wherein
   the warm-up controller, during the warm-up of the colorimeter, causes the display device to generate heat by displaying a predetermined video image on the display panel based on a video signal for reproduction and warms the colorimeter by the heat generated by the display device, the predetermined video image being different from images used in the color calibration.

3. A display device control system comprising a display device and a control device, and further comprising:
   a warm-up determiner which determines, when color calibration of the display device is to be performed, whether a warm-up of a colorimeter is necessary, based on a predetermined condition, the colorimeter being outside the display device and attachable to a display panel of the display device;
   a display controller which causes, when the warm-up determiner determines that the warm-up of the colorimeter is necessary, a predetermined image to be displayed on the display panel, the predetermined image indicating an attachment position on the display panel at which the colorimeter is to be attached by a user; and
   a warm-up controller which starts, when the colorimeter is determined as being attached at the attachment position, the warm-up of the colorimeter, that is directly in contact with the display panel at the attachment position, by using the display device.

4. A control method of a control device, the control method comprising:
   determining, when color calibration of a display device is to be performed, whether a warm-up of a colorimeter is necessary, based on a predetermined condition, the colorimeter being outside the display device and attachable to a display panel of the display device;
   causing, when the warm-up of the colorimeter is determined as being necessary, a predetermined image to be displayed on the display panel, the predetermined image indicating an attachment position on the display panel at which the colorimeter is to be attached by a user;
   determining whether the colorimeter is attached at the attachment position; and
   starting, when the colorimeter is determined as being attached at the attachment position, the warm-up of the colorimeter, that is directly in contact with the display panel at the attachment position, by using the display device.

* * * * *